(12) United States Patent
Ono

(10) Patent No.: US 7,784,276 B2
(45) Date of Patent: Aug. 31, 2010

(54) EXHAUST GAS PURIFIER AND METHOD OF CONTROL THEREFOR

(75) Inventor: Taisuke Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 1076 days.

(21) Appl. No.: 10/586,689

(22) PCT Filed: Jan. 18, 2005

(86) PCT No.: PCT/JP2005/000521

§ 371 (c)(1),
(2), (4) Date: Jul. 20, 2006

(87) PCT Pub. No.: WO2005/071236

PCT Pub. Date: Aug. 4, 2005

(65) Prior Publication Data

US 2008/0141663 A1      Jun. 19, 2008

(30) Foreign Application Priority Data

Jan. 21, 2004      (JP) .............................. 2004-013394

(51) Int. Cl.
*F01N 3/00* (2006.01)
(52) U.S. Cl. .............................. 60/301; 60/300; 60/289; 60/285; 60/273; 422/182; 422/183
(58) Field of Classification Search .................. 60/273, 60/274, 276, 284, 285, 286, 287, 289–292, 60/295, 298–301, 303–304, 307; 422/183, 422/182

See application file for complete search history.

(56) References Cited

U.S. PATENT DOCUMENTS 4,354,821 A * 10/1982 Kesselring et al. ............. 431/7

(Continued)

FOREIGN PATENT DOCUMENTS

JP      59-191809 A      10/1984

(Continued)

OTHER PUBLICATIONS

International Search Report dated Apr. 26, 2005 with an English translation of the pertinent portion (five (5) pages).

*Primary Examiner*—Thomas E Denion
*Assistant Examiner*—Jesse Bogue
(74) *Attorney, Agent, or Firm*—Crowell & Moring LLP

(57) ABSTRACT

It is intended to efficiently remove particulate substances, such as NOx and soot, without poisoning by Sox, etc. from dilute-combustion effecting internal combustion engines, combustion equipment, etc. There is provided an exhaust gas purifier to be installed in exhaust passage (2) of internal combustion engine (1) or the like, comprising, disposed in the exhaust passage (2), NOx adsorbent (4) capable of temporarily adsorbing nitrogen oxides even in an atmosphere of excess air and capable of desorbing the adsorbed nitrogen oxides upon temperature rise or in a reducing atmosphere, adsorbed substance desorbing means (3) arranged on an exhaust upstream side as compared with the NOx adsorbent (4) and capable of heating the exhaust or converting it to a reducing atmosphere, and combustion device (5) arranged on an exhaust downstream side as compared with the NOx adsorbent (4) and composed of fuel nozzle (6) and igniter (7). In normal operation, the NOx adsorbent (4) adsorbs NOx contained in exhaust gas. When the amount of NOx adsorbed increases to saturation, the adsorbed substance desorbing means (3) and the combustion device (5) are operated to thereby desorb the NOx, which is burned off in combustion over-rich combustion region (X1) of the combustion device (5).

22 Claims, 16 Drawing Sheets

U.S. PATENT DOCUMENTS 5,465,574 A * 11/1995 Ma .............................. 60/300
5,577,906 A * 11/1996 Hanakata et al. ............. 431/268
6,023,929 A *  2/2000 Ma .............................. 60/295

FOREIGN PATENT DOCUMENTS

| JP | 3-135417 A | 6/1991 |
| JP | 2001-329835 A | 11/2001 |
| JP | 2002-256867 A | 9/2002 |
| JP | 2003-27927 A | 1/2003 |
| JP | 2003-307114 A | 10/2003 |
| JP | 2003-314243 A | 11/2003 |
| JP | 2003-336520 A | 11/2003 |

\* cited by examiner

EXHAUST GAS PURIFIER AND METHOD OF CONTROL THEREFOR

TECHNICAL FIELD

The present invention relates to an apparatus for purifying exhaust gas of an internal combustion engine such as a diesel engine, a gas engine, a gasoline engine, a gas turbine engine or the like, or a combustion device such as an incinerator, a boiler or the like, and more particularly to an exhaust gas purifier installed within an exhaust gas passage and mainly removing nitrogen oxide and a particulate matter such as soot or the like.

BACKGROUND ART

A target substance subject to exhaust gas purification is a particulate matter such as nitrogen oxide, carbon monoxide, unburned hydrocarbon, soot and the like, however, various apparatuses for purifying these substances have been conventionally developed.

As an apparatus for reducing the nitrogen oxide (NOx), a denitration apparatus or the like has come into practical use, in which a reduction catalyst using an ammonia or an urea as a reducing agent is installed in an exhaust passage, thereby selectively reducing the nitrogen oxide. Further, in a comparatively compact gas engine or an automotive gasoline engine, there has been developed a three-way catalyst which can simultaneously decompose three elements comprising the nitrogen oxide, the carbon monoxide (CO) and the unburned hydrocarbon (HC), and the three-way catalyst contributes to an effective purification of the exhaust gas.

However, it has been known that the three-way catalyst effectively achieves a purifying operation in the case that the three-way catalyst is operated at a theoretical air fuel ratio or within a range close thereto, but is not effectively operated under the other conditions, particularly in exhaust gas in which air (oxygen) is excess. In order to cope with this, in the gas or gasoline engine operated in the excess air state, a nitrogen oxide occluding catalyst system has come into practical use, which temporarily occludes the nitrogen oxide in an occluding agent at a time of being operated under the excess air (oxygen) condition, and next discharges and reduces the occluded nitrogen oxide by being operated under the excess fuel condition.

However, there has been known that in the nitrogen oxide occluding catalyst system, the catalyst is poisoned by sulfur oxide (SOx) in the exhaust gas derived from a sulfur component in the fuel, and a purifying capacity of the nitrogen oxide is rapidly reduced, and the nitrogen oxide occluding catalyst system is used only in the engine using a low sulfur containing fuel in an actual condition. In this case, there has been developed a purifier (patent document 1) having a structure which reduces nitrogen oxide adsorbed to the occluding substance and discharging the sulfur oxide or the like, by occluding the nitrogen oxide by the occluding substance within a nitrogen oxide purifying tower and burning within the nitrogen oxide purifying tower, however, since the structure is made such as to burn within the purifying tower having the occluding substance built-in, a durability of the occluding substance is actually a problem.

Further, for removing the particulate substance such as the soot or the like, an electric precipitator and a DPF come into practical use. The DPF is structured such as to capture the particulate substance by a filter, and burns and removes said captured particulate substance by an electric heater or the like, however, there has been recently developed a DPF in which a catalyst component having an oxidizing operation is carried in a fine particle filter, and the particulate substance can be continuously removed.

Patent Document 1

Japanese Unexamined Patent Publication No. 2003-27927

DISCLOSURE OF INVENTION

Problems to be Solved by the Invention

Said three-way catalyst cannot achieve the catalyst function in the internal combustion engine or the fuel equipment operated under the excessive air condition, as has been already explained. Further, in said nitrogen oxide occluding catalyst system coming into practical use in the compact gas engine or the automotive gasoline engine, it is hard to effectively achieve the purifying capacity in the exhaust gas containing the sulfur oxide or the particulate substance.

In the industrial internal combustion engine, the combustion equipment and the marine internal combustion engine, most of them are operated under the excessive air condition, and the fuel containing the sulfur component is used. Accordingly, a lot of sulfur oxide and particulate substance are contained in the exhaust gas, and there is desired an exhaust gas purifier which can sufficiently achieves a performance under the exhaust gas mentioned above.

In this case, the denitration apparatus selectively reducing the nitrogen oxide by using the ammonia, the urea or the like is applied to the comparatively large-sized industrial internal combustion engine or combustion equipment, however, the apparatus itself is on a large scale and is very expensive, and a maintaining cost of the ammonia or the urea in the reducing agent becomes high. Further, there is a great possibility that the unconsumed ammonia is discharged in the atmospheric air.

OBJECT OF THE INVENTION

An object of the present invention is to provide an exhaust gas purifier which can remove nitrogen oxide, a particulate substance such as soot or the like, carbon monoxide and unburned hydrocarbon in exhaust gas, and can be maintained without lowering a purifying capacity thereof, in an internal combustion engine or a combustion equipment mainly operated under an excess air condition. Further, an object of the present invention is to reduce a deterioration of a catalyst due to a poisoning of sulfur oxide as in the conventional structure, and sufficiently achieve a performance even in a fuel containing a lot of sulfur component.

Means for Solving the Problem

In order to solve the problem mentioned above, in accordance with a basis invention of a first aspect of the present invention, there is provided an exhaust gas purifier installed in an exhaust passage of an internal combustion engine of a combustion equipment, comprising: a nitrogen oxide adsorbent temporarily adsorbing nitrogen oxide, and desorbing said adsorbed nitrogen oxide by a heating or a reducing atmosphere; an adsorbed substance desorbing means arranged in an exhaust gas upstream side of said nitrogen oxide adsorbent and heating the exhaust gas or converting the exhaust gas to the reducing atmosphere; and a combustion apparatus arranged in an exhaust gas downstream side of said nitrogen oxide adsorbent and constituted by a fuel supply means and an ignition means, wherein the nitrogen oxide adsorbent, the adsorbed substance desorbing means and the combustion apparatus are provided within the exhaust passage.

In accordance with a second aspect of the present invention, there is provided an exhaust gas purifier as recited in the first aspect, wherein said combustion apparatus has an over-rich combustion region burning under an excess fuel condition by the fuel supplied from said fuel supply means and the exhaust gas from said nitrogen oxide adsorbent, and a lean fuel combustion region positioned in an exhaust gas downstream side of said over-rich combustion region and burning under an excessive air condition by the exhaust gas from said over-rich combustion region and the air from the air supply means.

In accordance with a third aspect of the present invention, there is provided an exhaust gas purifier as recited in the first or second aspect, wherein said exhaust gas passage is branched into a plurality of branch exhaust gas passages, an exhaust gas inlet of each of the branch exhaust gas passages is provided with an exhaust gas isolating means capable of isolating the exhaust gas, and each of the branch passages is provided with said nitrogen oxide adsorbent, the adsorbed substance desorbing means arranged in the exhaust gas upstream side of said nitrogen oxide adsorbent, having the air supply means and heating the air supplied from said air supply means or converting the air to the reducing atmosphere, and said combustion apparatus arranged in the exhaust gas downstream side of said nitrogen oxide adsorbent.

Various structures can be applied to said adsorbed substance desorbing means, however, the present invention employs an adsorbed substance desorbing means constituted by a heating means and a reducing agent supply means, an adsorbed substance desorbing means constituted by a heat generating resistance, an adsorbed substance desorbing means constituted by an adsorbed substance desorbing fuel supply means, an adsorbed substance desorbing means constituted by an adsorbed substance desorbing fuel supply means and a catalyst arranged in the exhaust gas downstream side of said adsorbed substance desorbing fuel supply means and having an oxidizing operation, or a desorbing combustion apparatus constituted by an adsorbed substance desorbing air supply means, an adsorbed substance desorbing fuel supply means and an adsorbed substance desorbing ignition means.

In order to capture the particulate substance, it is possible to arrange a fine particle filter for capturing the particulate substance in the exhaust gas upstream side of the nitrogen oxide adsorbent, or it is possible to form a shape of the nitrogen oxide adsorbent itself in a physical shape capable of capturing the particulate substance. Said fine particle filter may be structured such as to have a function of only capturing the particulate substance, but can employ a structure including a catalyst having an oxidizing operation and capable of continuously oxidizing the particulate substance. Further, as a specific shape of the nitrogen oxide adsorbent, it is possible to employ a structure obtained by alternately closing ends of honeycombs of a catalyst support one by one in an exhaust gas flow direction (a plugging type or a wall flow type). Accordingly, it is possible to effectively remove the particles.

In order to sufficiently achieve the performance of the nitrogen oxide adsorbent even if the sulfur oxide is contained in the exhaust gas, it is possible to arrange the sulfur oxide adsorbent in the exhaust gas upstream side of the nitrogen oxide adsorbent.

The air supply means of the combustion apparatus used for forming said fuel lean combustion region can be connected to an outlet portion of a compressor of a supercharger so as to utilize a compressed air from the supercharger, in the case of an internal combustion engine with supercharger.

In the case that the adsorbed substance desorbing combustion apparatus is provided as said adsorbed substance desorbing means, a flame holding mechanism can be provided in the adsorbed substance desorbing combustion apparatus and/or the combustion apparatus arranged in a downstream side of the adsorbed substance. The flame holding mechanism corresponds to a mechanism for slowing a flow speed of the exhaust gas by partially isolating the flow of the exhaust gas, forming a back flow region (a vortex region) and holding the flame. It is possible to swirl the exhaust gas by a swirl vane or the like, whereby it is possible to form an exhaust gas circulating region, and it is effective to employ a means for supplying a small amount of air so as to form a high oxygen concentration region near the fuel supply means.

In the case that the internal combustion engine to which the exhaust gas passage is connected is of a compression ignition type, it is possible to utilize as the adsorbed substance desorbing means by controlling a fuel injection valve directly injecting the fuel into the cylinder of the internal combustion engine. The nitrogen oxide of the nitrogen oxide adsorbent is desorbed by increasing the temperature of the exhaust gas, for example, by injecting a secondary fuel in an engine expansion stroke or an exhaust stroke or slowing an injection timing, and supplying CO or HC. Further, in the gasoline engine and the gas engine operated under the excess air condition, NOx can be desorbed by increasing the exhaust gas temperature by temporarily executing the excess fuel operation and forming the reducing atmosphere.

Further, a heat exchanger is arranged in an exhaust gas downstream side of a lean fuel combustion region of the combustion apparatus, and said heat exchanger is connected to the air supply means of said adsorbed substance desorbing means, whereby a high-temperature air heated by heat exchanged for the exhaust gas from the lean fuel combustion region in said heat exchanger can be utilized for the air supply means of said adsorbed substance desorbing means.

In the structure in which the exhaust gas passage is branched into a plurality of branch exhaust gas passages, the structure can be made such that an atmospheric air releasing portion having an opening and closing valve is provided in an exhaust gas downstream side of said lean fuel combustion region in each of the branch exhaust gas passages, the exhaust gas downstream side portion from the atmospheric air releasing portion in each of the branch exhaust gas passages is combined with a combined exhaust gas passage, said combined portion is provided with an outlet side switch valve selectively connecting each of the branch exhaust gas passages to the downstream side exhaust gas passage, the exhaust gas in the branch exhaust gas passage is discharged to the downstream side exhaust gas passage by closing the opening and closing valve at a time of a normal operation, and the exhaust gas in the branch exhaust passage is discharged to the atmospheric air by opening the opening and closing valve at a time when the adsorbed substance desorbing means (a heating means or the like) and the combustion apparatus are activated.

In accordance with the present invention, there is provided a control method of each of said exhaust gas purifier. In other words, there is provided a method of controlling the exhaust gas purifier as recited in the second or third aspect, wherein a temperature detecting means is arranged in an exhaust gas upstream side of said nitrogen oxide adsorbent, an adsorbed amount detecting means for detecting an adsorbed amount by the nitrogen oxide adsorbent is arranged in the exhaust gas downstream side of said nitrogen oxide adsorbent, an adsorbed amount by the nitrogen oxide adsorbent at a time of the normal operation is detected by said adsorbed amount detecting means, the method actuates the combustion apparatus at the same time of or behind actuating said adsorbed amount desorbing means at a time when the adsorbed amount reaches a predetermined amount, the method controls such that an air-fuel mixture constituted by the exhaust gas from the nitrogen oxide adsorbent and the fuel supplied from the fuel supply means becomes excess in fuel, in the over-rich combustion region, the method controls such that an air-fuel mixture constituted by the exhaust gas from the nitrogen oxide adsorbent and the air supplied from the sir supply means becomes excess in air, in the lean fuel combustion region, and the method stops the actuation of said adsorbed substance desorbing means and the combustion apparatus if a state in which all the adsorbed substance of the nitrogen oxide adsorbent is desorbed is detected by said adsorbed amount detecting means, thereby returning to the normal operation state.

In said control method, the nitrogen oxide contained in the exhaust gas at a time of the normal operation is adsorbed by the nitrogen oxide adsorbent, and the unburned combustible such as the carbon monoxide, the hydrocarbon or the like is oxidized by the catalyst component contained in the nitrogen oxide adsorbent and having the oxidizing operation so as to be defused. In the case that the particulate substance is contained, the particulate substance can be captured and purified by setting a shape of the nitrogen oxide adsorbent to a shape suitable for capturing the particulate substance. If the nitrogen oxide adsorbing amount of the nitrogen oxide adsorbent reaches a predetermined amount (for example, a saturated amount), the nitrogen oxide is desorbed by heating the nitrogen oxide adsorbent by means of the nitrogen oxide deserving means such as the heating means or the like, and is reduced and removed in the excess right fuel combustion region in the exhaust gas downstream side, and the carbon monoxide, the hydrocarbon, the particulate substance or the like discharged from the internal combustion engine or the combustion equipment is oxidized and removed in the lean fuel combustion region in the exhaust gas downstream side. Further, said captured particulate substance can be burned and removed at a time of heating the nitrogen oxide adsorbent. Further, in the case that the sulfur oxide is contained in the exhaust gas, the sulfur oxide is deserved and the nitrogen oxide adsorbent is regenerated by setting a substance of the nitrogen oxide adsorbent to a substance which is hard to adsorb the sulfur oxide, or heating the adsorbent to a sulfur oxide deserving temperature even if it is adsorbed, and forming a reducing atmosphere as occasion demands.

In a control method of an exhaust gas purifier having a plurality of branch exhaust gas passages, a temperature detecting means is arranged in an exhaust gas upstream side of said nitrogen oxide adsorbent, an adsorbed amount detecting means is arranged in the exhaust gas downstream side of said nitrogen oxide adsorbent, in each of the branch exhaust gas passages. The exhaust gas from the internal combustion engine or the combustion equipment is flowed in at least one branch exhaust passage, and an adsorbed amount by the nitrogen oxide adsorbent at a time of the normal operation is detected by said adsorbed amount detecting means. The method isolates an exhaust gas flow in said branch exhaust gas passages by an exhaust gas isolating means at a time when the adsorbing amount reaches a predetermined amount, the method actuates the combustion apparatus at the same time of or before or behind actuating said adsorbed amount desorbing means, the method controls such that an air-fuel mixture constituted by the exhaust gas from the internal combustion engine or the like and the fuel supplied from the fuel supply means of the combustion apparatus becomes excess in fuel, in the over-rich combustion region within said branch exhaust gas passage, the method controls such that an air-fuel mixture constituted by the exhaust gas from the over-rich combustion region and the air supplied from the sir supply means of the combustion apparatus becomes excess in air, in the lean fuel combustion region. The method stops the actuation of said adsorbed substance desorbing means and the combustion apparatus if a state in which all the adsorbed substance of the nitrogen oxide adsorbent is desorbed is detected by said adsorbed amount detecting means, thereby returning to the normal operation state, and said control is executed in each of the branch exhaust gas passages in such a manner as to prevent all the branch exhaust gas passages from simultaneously isolating the exhaust gas.

In the control method of said branch exhaust passage type exhaust gas purifier, the normal operation and the reproducing operation are alternately or alphabetically executed in each of the branch exhaust gas passages. For example, in the case of having two branch exhaust gas passages, the exhaust gas in the internal combustion engine or the combustion equipment is first flowed in one branch exhaust gas passage, and if the adsorbing amount of the nitrogen oxide to the nitrogen oxide adsorbent reaches the predetermined amount (for example, the saturated amount), one branch exhaust gas passage is isolated, and the other branch exhaust gas passage is connected to the internal combustion engine, thereby flowing the exhaust gas therein. In other words, the normal operation state is taken over by the other branch exhaust gas passage, and said one branch exhaust gas passage executes the reproduction operation.

Further, in the control method of the exhaust gas purifier, a temperature detecting means and a pressure detecting means are arranged in the exhaust gas upstream side of said nitrogen oxide adsorbent, and an adsorbed amount detecting means is arranged in the exhaust gas downstream side of said nitrogen oxide adsorbent. An exhaust gas pressure in the exhaust gas upstream side of the nitrogen oxide adsorbent at a time of the normal operation is detected by the pressure detecting means, and an adsorbed amount by the nitrogen oxide adsorbent is detected by said adsorbed amount detecting means. The method controls such as to actuate the combustion apparatus at the same time or before of behind actuating said adsorbed substance desorbing means at any earlier time of a time when an amount of the captured particulate substance is increased and the exhaust gas pressure in the exhaust gas passage reaches a predetermined value and a time when the adsorbed amount reaches a predetermined amount. In the case that a fine particle filter or an SOx adsorbent is arranged in an upstream side of the nitrogen oxide adsorbent, the pressure detecting means is arranged in an upstream side of the fine particle filter or the SOx adsorbent.

EFFECT OF THE INVENTION

A description will be first given briefly of a basic operation of the present invention. During the normal operation, the adsorbed substance desorbing means and the combustion apparatus are stopped, and the nitrogen oxide in the exhaust gas discharged from the internal combustion engine or the like is adsorbed to the nitrogen oxide adsorbent. The unburned combustible such as the hydrocarbon, the carbon monoxide or the like in the exhaust gas is oxidized by the catalyst contained in the nitrogen oxide adsorbent and having the oxidizing operation, and is defused. If the adsorbed amount of the nitrogen oxide adsorbent reaches the predetermined amount (for example, the saturated amount), the adsorbed substance desorbing means and the combustion apparatus are actuated, and the nitrogen oxide is desorbed from the nitrogen oxide adsorbent, and is fed to the combustion apparatus so as to be reduced and removed, for example, in the local over-rich combustion region within the combustion frame of the combustion apparatus. During the regenerating operation, the hydrocarbon, the carbon oxide or the particulate substance in the exhaust gas is oxidized and removed outside the over-rich region of the combustion apparatus. Further, in the case that the sulfur oxide is contained in the exhaust gas, the sulfur oxide is desorbed from the adsorbent by setting the substance of the nitrogen oxide adsorbent to the structure to which the sulfur oxide is hard to be adsorbed, or heating the adsorbent to the sulfur oxide desorbing temperature by utilizing the adsorbed substance desorbing means or forming the reducing atmosphere even if the sulfur oxide is adsorbed, thereby preventing the adsorbent from being poisoned. The present invention having the basic operation mentioned above achieves the following effects.

(1) Particularly in the internal combustion engine or the combustion equipment which is operated under the excess air condition, it is possible to efficiently adsorb the nitrogen oxide in the exhaust gas by the nitrogen oxide adsorbent during the normal operation, and it is possible to discharge the nitrogen oxide by burning and removing by the combustion apparatus in the regenerating operation. Further, it is possible to prevent the nitrogen oxide adsorbent from being poisoned by the sulfur oxide, and it is possible to maintain the purifying capacity.

(2) Since the nitrogen oxide desorbed from said nitrogen oxide adsorbent passes through said over-rich combustion region without omission by forming the over-rich combustion region in the exhaust gas upstream side within said combustion apparatus and forming the lean fuel combustion region in the exhaust gas downstream side, a reducing and removing rate of the nitrogen oxide is improved.

(3) In the case that the exhaust gas passage is branched into two or more branch exhaust gas passages, and the adsorbed substance desorbing means, the nitrogen oxide adsorbent and the combustion apparatus which are the same as those of the single exhaust passage structure are arranged within each of the branch exhaust gas passages alphabetically from the upstream side, the exhaust gas from the internal combustion engine or the like can be flowed to at least one branch exhaust gas passage, and the remaining branch exhaust gas passages can isolate the exhaust gas, and execute the regenerating operation. Accordingly, since the exhaust gas to the branch exhaust gas passages in the regenerating operation state is in the isolated state, it is possible to freely set the air amount into the branch exhaust gas passages in the regenerating operation state regardless of the exhaust gas amount of the internal combustion engine or the combustion equipment. Accordingly, it is possible to set the air amount of the branch exhaust gas passages in the regenerating operation state small independently from the branch exhaust gas passage in the normal operation state, it is possible to set the energy (the fuel flow rate) consumed for desorbing the nitrogen oxide from the nitrogen oxide adsorbent and the fuel flow rate supplied to the combustion apparatus small, and it is possible to save the fuel cost.

(4) In the case that the heating means and the reducing agent supply means are provided as the adsorbed substance desorbing means, it is possible to efficiently desorb the nitrogen oxide and the sulfur oxide from the nitrogen oxide adsorbent by injecting the reducing agent.

(5) In the case that the heat generating resistance, for example, the electric heater or the like is provided as the adsorbed substance desorbing means, it is possible to securely and rapidly heat.

(6) In the case that the adsorbed substance desorbing fuel supply means is provided as the adsorbed substance desorbing means, the supplied fuel plays a part in the reducing agent, and it is possible to utilize the heat generation at a time of being oxidized on the catalyst contained in the nitrogen oxide adsorbent and having the oxidizing operation.

(7) In the case that the adsorbed substance desorbing means is provided with the adsorbed substance desorbing fuel supply means and the catalyst arranged in the exhaust gas downstream side from said adsorbed substance desorbing fuel supply means and having the oxidizing operation, the heat is generated at a time of being oxidized on the catalyst contained in the nitrogen oxide adsorbing substance and having the oxidizing operation, and it is possible to utilize the heat for desorbing.

(8) In the case that the adsorbed substance desorbing means is provided with the desorbing combustion apparatus constituted by the adsorbed substance desorbing air supply means, the adsorbed substance desorbing fuel supply means and the adsorbed substance desorbing ignition means, it is possible to heat up to the higher temperature in a moment of time, and it is possible to flexibly correspond to various conditions by adjusting the air flow rate and the fuel flow rate.

(9) In the case that the fine particle filter is arranged in the exhaust gas upstream side of the nitrogen oxide adsorbent, the particulate substance in the exhaust gas is removed before flowing in the nitrogen oxide adsorbent. Accordingly, the nitrogen oxide adsorbing rate by the nitrogen oxide adsorbent is not affected by the particulate substance, and it is possible to well adsorb the nitrogen oxide. In this case, if the capturing amount of the particulate substance to the fine particle filter becomes in the saturated state, the back pressure is increased, however, it is possible to burn and remove the particulate substance on the basis of the temperature increase of the adsorbed substance desorbing means at a time when the adsorbing amount of the nitrogen oxide in the nitrogen oxide adsorbent becomes in the saturated state and the regenerating operation is executed, whereby it is possible to regenerate the fine particle filter.

(10) It is possible to keep the purifier compact while structuring such that it is possible to remove the particulate substance, by forming the shape of the nitrogen oxide adsorbent itself in the physical shape capable of capturing the particulate substance.

(11) In the case that the sulfur oxide adsorbent is arranged in the exhaust gas upstream side of the nitrogen oxide adsorbent, it is possible to adsorb the sulfur oxide and the nitrogen oxide respectively to the sulfur oxide adsorbent and the nitrogen oxide adsorbent, and it is possible to efficiently adsorb them. In this case, the sulfur oxide adsorbent can be heated at the same time when the adsorbing amount of the nitrogen oxide adsorbent becomes in the saturated state and the regenerating operation is executed, thereby desorbing the sulfur oxide so as to regenerate.

(12) The independently installed air supply means is not necessary by utilizing a part of the compressed air from the supercharger as the air supply means used for forming said lean fuel combustion region, and it is possible to achieve a compact apparatus.

(13) In the case that the air supply means for supplying the air, and the catalyst having the oxidizing function are alphabetically arranged in place of the lean fuel combustion region formed in the exhaust gas downstream side of said over-rich combustion region, it is possible to well oxidize and remove the unburned hydrocarbon and the carbon monoxide even in the state in which the temperature is comparatively low, and it is possible to contribute to the compact apparatus.

(14) In the case that an exhaust gas cooling means is arranged and a temperature sensor is provided in the exhaust gas upstream side of said adsorbed substance desorbing means, it is possible to control the temperature of the exhaust gas flowing in the nitrogen oxide adsorbent to a temperature at which an adsorbing capacity of the nitrogen oxide adsorbent can best achieved, and it is possible to well remove the nitrogen oxide in whatever operated state of the internal combustion engine and the fuel equipment. Further, it is possible to correspond to the adsorbent having various active temperature bands.

(15) In the case that said adsorbed-substance desorbing means is provided with a nitrogen oxide desorbing combustion apparatus having a frame holding mechanism, it is possible to stably burn the nitrogen oxide with respect to the exhaust gas in which a residual oxygen concentration is low.

(16) In a compression ignition type internal combustion engine, t is possible to rise the exhaust gas temperature by structuring in such a manner as to inject a secondary fuel in an expansion stroke and an exhaust stroke of the engine, and it is possible to desorb the nitrogen oxide without any new special adsorbed substance desorbing means, by including a lot of reducing component such as the carbon monoxide, the hydrocarbon or the like. Accordingly, it is possible to achieve a simple structure of the exhaust gas purifier.

(17) In the compression ignition type internal combustion engine, it is possible to rise the exhaust gas temperature by slowing the fuel ignition timing, and it is possible to desorb the nitrogen oxide without any new special adsorbed substance desorbing means, by increasing a reducing component such as CO, HC or the like. Accordingly, it is possible to achieve a simple structure of the exhaust gas purifier.

(18) It is possible to make the exhaust gas purifier compact without the need for specially arranging the heating means or the like in the exhaust gas upstream of the adsorbent, by arranging a heat exchanger in the exhaust gas downstream side of said lean fuel combustion region, adsorbing the heat of the high-temperature exhaust gas from the lean fuel combustion region by said heat exchanger, and utilizing the heat for the adsorbed substance desorbing means. Further, it is possible to make a frame temperature in the over-rich combustion region higher, and the reducing rate of the nitrogen oxide is improved.

(19) In the case that in the exhaust gas purifier arranged within each of a plurality of branched exhaust gas passages, each of the branch exhaust gas passages is selectively released to the atmospheric air, for example, the sulfur oxide adsorbed to the nitrogen oxide adsorbent together with the nitrogen oxide is desorbed during the regenerating operation, however, is discharged by being released to the atmospheric air. On the other hand, since the sulfur oxide is adsorbed and removed, for example, by the nitrogen oxide adsorbent at a time of the normal operation, the sulfur oxide is not discharged. Accordingly, in the case of recovering the exhaust heat of the exhaust gas by the exhaust gas boiler, it is possible to recover the heat to the low temperature without considering a corrosion of the exhaust gas boiler by the acid, by utilizing the exhaust gas at a time of the normal operation, and a heat recovery rate is widely improved. In this case, in the case that the exhaust gas containing the sulfur oxide is used for the exhaust heat boiler or the like, the boiler is corroded if the temperature descends to a predetermined temperature or less. Accordingly, it is impossible to recover the heat to the low temperature, and the heat recovery rate is deteriorated.

(20) In the structure of adsorbing the nitrogen oxide by the nitrogen oxide adsorbent and capturing the particulate substance, in the case that the capturing amount of the particulate substance is more than the adsorbing amount of the nitrogen oxide, there is a possibility that a harmful component can not be removed efficiently if the regenerating operation is executed on the basis of the adsorbing amount of the nitrogen oxide. Accordingly, it is possible to effectively remove the harmful-substance and it is possible to previously prevent the performance of the adsorbent from being deteriorated, by providing with a pressure detecting means in the exhaust gas upstream side of the nitrogen oxide adsorbent, arranging the adsorbed amount detecting means in the exhaust gas downstream side, and executing the regenerating operation at an earlier time of a time when the pressure by the pressure detecting means becomes equal to or more than a predetermined value, or a time when the adsorbed amount reaches a predetermined amount (for example, a saturated amount).

Figure 1:
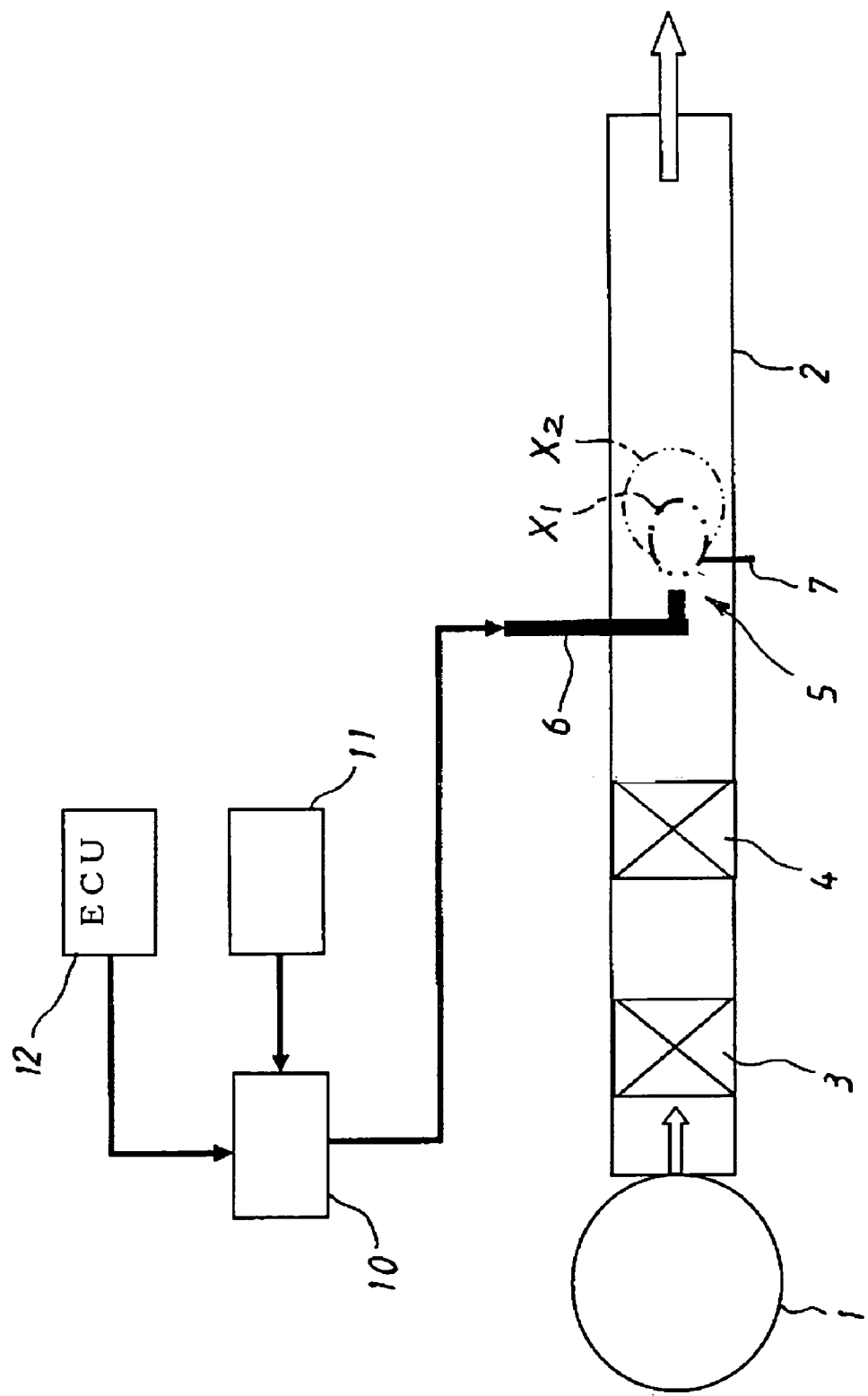
FIG. 1 is a schematic view showing a first embodiment in accordance with the present invention.

DESCRIPTION OF THE REFERENCE NUMERALS AND SYMBOLS 1 internal combustion engine
2 exhaust passage
2a, 2b branch exhaust passage
2c downstream side exhaust passage
3 adsorbed substance desorbing means
4 NOx adsorbent 5 combustion apparatus
6 fuel nozzle (fuel supply means)
7 igniter (ignition means)
10 fuel amount regulating apparatus
11 fuel tank
12 ECU (electronic control unit)
15 air supply means
16 air amount regulating apparatus
17 air supply apparatus
20 switching valve
31 fuel nozzle (fuel supply means)
32 igniter
33 air supply means
35 oxidizing catalyst
40 fine particle filter
42 SOx adsorbent
47 oxidizing catalyst
50 heat exchanger
51 air supply means
52 frame holding mechanism
55 heat exchanger
58 outlet side switching valve
60 atmospheric air releasing passage
61 opening and closing valve for releasing atmospheric air
80 adsorbed amount detecting sensor (adsorbed amount detecting means)
81 pressure sensor (pressure sensing means)
82 temperature sensor (temperature detecting means)
X1 over-rich combustion region
X2 lean fuel combustion region

BEST MODE FOR CARRYING OUT THE INVENTION

First Embodiment of the Invention

FIG. 1 shows a basic structure of an exhaust gas purifier provided in a single exhaust gas passage, in accordance with a first embodiment of the present invention. The exhaust gas purifier in accordance with the present invention is arranged in a single exhaust gas passage 2 of an internal combustion engine 1 or a combustion equipment. As the internal combustion engine 1, there is a diesel engine, a gas engine, a gasoline engine, a gas turbine engine or the like, and as the combustion equipment, there is an industrial boiler or the like. Within the exhaust gas passage 2, there are arranged an adsorbed substance desorbing means 3, a nitrogen oxide adsorbent (hereinafter, refer to as "NOx adsorbent") 4 and a combustion apparatus 5 alphabetically from an exhaust gas upstream side while leaving a space in an exhaust gas flowing direction.

The combustion apparatus 5 is provided with a fuel nozzle 6 as a fuel supply means, and is provided with an igniter 7 as an ignition means, and the fuel nozzle 6 is connected to a fuel tank 11 via a fuel amount regulating apparatus 10, and is structured such that a supply amount and a supply timing of the fuel are controlled by an electronic control unit (hereinafter, refer to as "ECU") 12. The combustion apparatus 5 may be provided with an air supply apparatus as occasion demands. In a diffusion frame by the combustion apparatus 5, an over-rich combustion region X1 is locally formed even if an entire air fuel ratio is in an air excess state. In other words, the local over-rich combustion region X1 is formed near an injection port of the igniter 7 and the fuel nozzle 6, and a lean fuel combustion region X2 is formed around the region X1.

The NOx adsorbent 4 can efficiently adsorbs nitrogen oxide (hereinafter, refer to as "NOx") particularly even under an excess air atmosphere, and has a nature of desorbing the adsorbed NOx at a time of being heated to a predetermined temperature or under a reducing atmosphere. In the embodiment mentioned above, the NOx adsorbent 4 includes a catalyst having an oxidizing operation, and oxidizes unburned combustible such as carbon monoxide (hereinafter, refer to as "CO"), hydrocarbon (hereinafter, refer to as "HC") or the like, and a shape of the nitrogen oxide adsorbent 4 itself has a shape which is suitable for capturing a particulate substance.

As the adsorbed substance desorbing means 3, there is employed, for example, a heating means for heating the exhaust gas to a predetermined temperature or more, however, there can be employed a means for changing the exhaust gas to a reducing atmosphere. Further, the structure can be made such that a reducing agent supply means is added to the heating means, thereby efficiently adsorbing and desorbing the NOx and the SOx. As the heating means, there can be employed a heat generating resistance, for example, an electric heater, whereby it is possible to rapidly and securely heat up. Further, as the other example of the adsorbed substance desorbing means 3, a fuel supply means can be provided. In this case, the supplied fuel plays a part in the reducing agent, and the NOx is desorbed by utilizing the heat generation at a time of being oxidized on the catalyst contained in the NOx adsorbent 4 and having the oxidizing operation.

In the structure shown in FIG. 1, the adsorbed substance desorbing means (the heating means) 3 and the combustion apparatus 5 stop at a time of the normal operation of the internal combustion engine 1. Accordingly, the exhaust gas discharged from the internal combustion engine 1 to an inner side of the exhaust gas passage 2 reaches the NOx adsorbent 4 as it is, and the NOx is adsorbed. At the same time, it is possible to oxidize the unburned combustible such as CO, HC or the like by the oxidizing catalyst contained in the NOx adsorbent 4 so as to defuse. Further, in the case that the shape of the nitrogen oxide adsorbent 4 is formed in a shape which is suitable for capturing the particulate substance, the particulate substance can be physically captured to the NOx adsorbent 4.

In the case that an adsorbing amount of the NOx adsorbent 4 reaches a predetermined amount (for example, a saturated amount), the adsorbed substance desorbing means 3 is actuated so as to increase a temperature of the exhaust gas to a predetermined temperature or more in an upstream side of the nitrogen oxide adsorbent 4, and the combustion apparatus 5 is actuated so as to execute a regenerating operation. At a time of the regenerating operation, the NOx adsorbent 4 is heated up to a temperature equal to or more than a predetermined temperature by the exhaust gas heated by the adsorbed substance desorbing means 3, whereby the NOx adsorbed to the NOx adsorbent 4 is desorbed, reaches the combustion apparatus 5 in the exhaust gas downstream side, and is reduced and removed in the local over-rich combustion region X1 within the combustion frame. Further, the particulate substance captured by the NOx adsorbent 4 is burned and removed on the basis of the temperature rising of the NOx adsorbent 4. Further, the CO, the HC and the particulate substance discharged from the internal combustion engine 1 and the over-rich combustion region at a time of the regenerating operation are burned and removed in the lean fuel combustion region X2 of the combustion apparatus 5. Further, in the case that the SOx is contained in the exhaust gas, the SOx is desorbed from the NOx adsorbent 4 by setting a substance of the NOx adsorbent 4 to a substance which is hard to adsorb the SOx or heating the NOx adsorbent 4 to the SOx desorbing temperature and forming the reducing atmosphere as occasion demands even in the case that the SOx is adsorbed. Accordingly, it is possible to prevent the NOx adsorbent 4 from being poisoned.

Second Embodiment of the Invention

Figure 2:
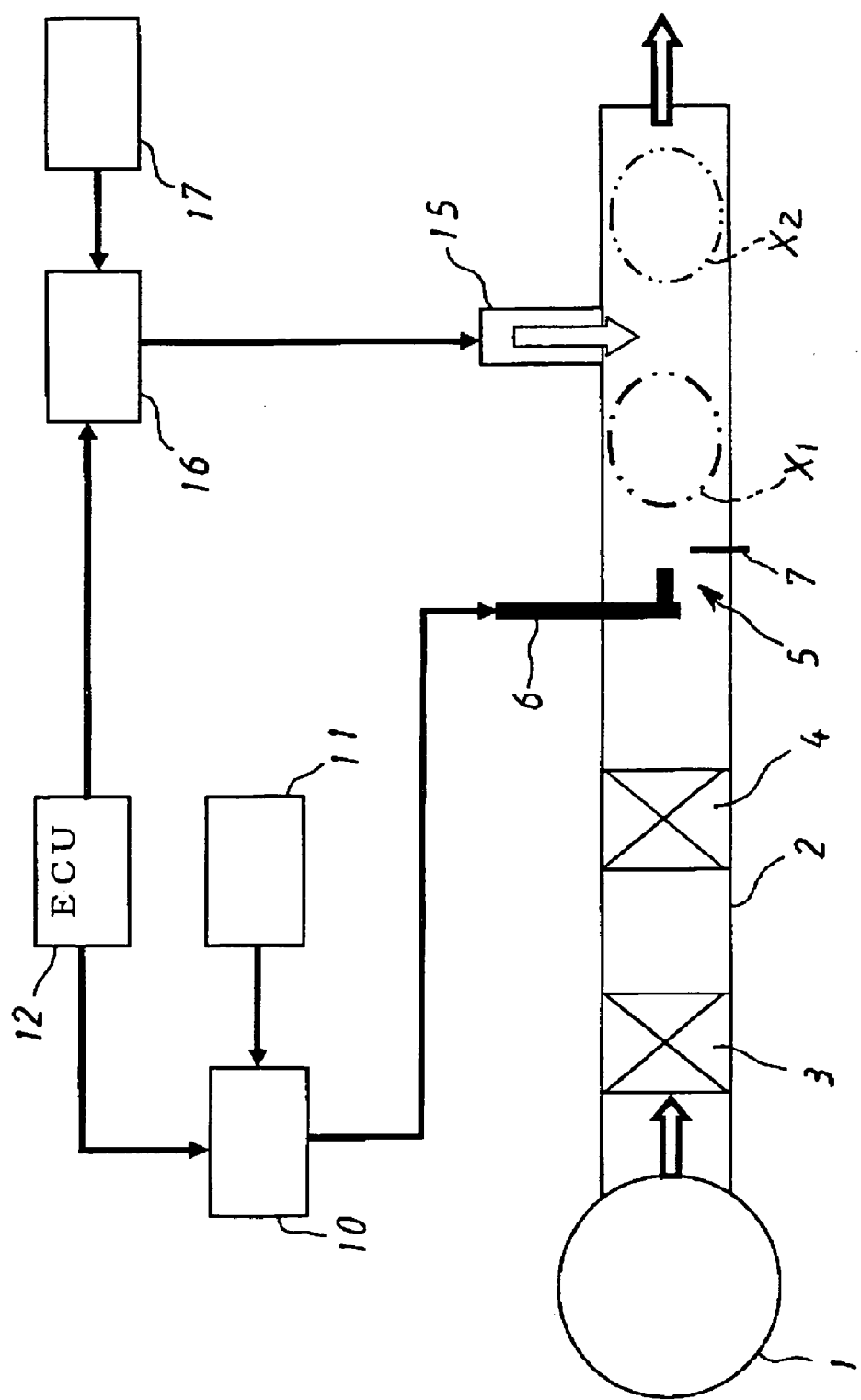
FIG. 2 is a schematic view showing a second embodiment in accordance with the present invention.

FIG. 2 shows a second embodiment in accordance with the present invention. The second embodiment is based on the exhaust gas purifier provided in the single type exhaust gas passage shown in FIG. 1, is provided with the fuel nozzle 6 and the igniter 7 in the same manner as FIG. 1 mentioned above as the combustion apparatus 5, and is provided with an air supply means 15 in an exhaust gas downstream side of the fuel nozzle 6 in addition thereto, whereby the over-rich combustion region X1 is formed in an exhaust gas upstream side of the air supply means 15, and the lean fuel combustion region X2 is formed in an exhaust gas downstream side of the air supply means 15. Both of the regions X1 and X2 mentioned above are formed respectively in such a manner as to cover an entire of a circulation cross section of the exhaust gas passage 2. Accordingly, the exhaust gas passing through the inner side of the combustion apparatus 5 is structured such as to inevitably pass through the over-rich combustion region X1 and the lean fuel combustion region X2 alphabetically.

The air supply means 15 is connected to an air supply source 17 via an air amount regulating apparatus 16, and the air amount regulating apparatus 16 is structured such that an air supply, an air stop and a supply amount of the air are controlled by an ECU 12. The other structures are the same as those of FIG. 1, and the same reference numerals are attached to the same parts and portions as those in FIG. 1.

The basic operation is the same as the case in FIG. 1, however, an operation in the combustion apparatus 5 is different. In other words, during the regenerating operation, the exhaust gas desorbed from the NOx adsorbent 4 so as to reach the combustion apparatus 5 first passes through the over-rich combustion region X1, whereby the NOx is reduced and removed, and next passes through the lean fuel combustion region X2, whereby the CO, the HC and the particulate substance discharged from the internal combustion engine 1 and the over-rich combustion region are burned and removed. In the structure in FIG. 1 mentioned above, the NOx is reduced in the locally formed over-rich combustion region X1, however, in the embodiment shown in FIG. 2, since the over-rich combustion region X1 is formed over the entire of the exhaust gas passage cross section, the NOx is reduced through the over-rich combustion region X1 without omission, and the reducing and removing rate is improved.

Third Embodiment of the Invention

Figure 3:
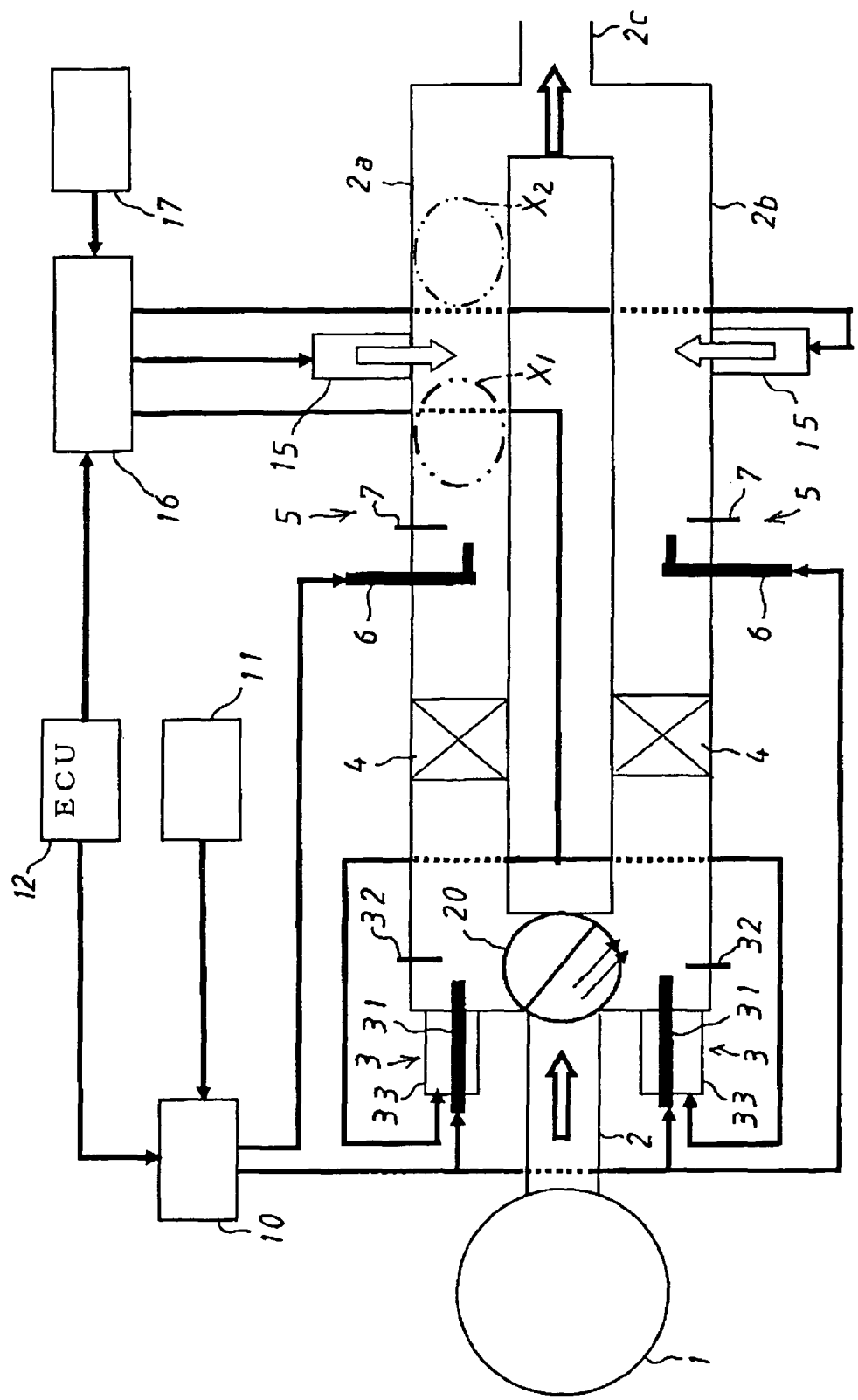
FIG. 3 is a schematic view showing a third embodiment in accordance with the present invention.

FIG. 3 shows a basic structure of an exhaust gas purifier provided in a branch type exhaust gas passage in which the exhaust gas passage 2 is branched into a plurality of sections, in accordance with a third embodiment of the present invention. The exhaust gas passage 2 of the internal combustion engine 1 or the combustion equipment is branched into, for example, first and second branch exhaust gas passages 2a and 2b, a switching valve 20 is arranged in the upstream side branch portion, and the branch exhaust gas passages 2a and 2b are again combined in a downstream side end portion so as to be connected to a downstream side exhaust gas passage 2c. The structure is made such that the exhaust gas from the internal combustion engine 1 can be selectively discharged to one of the branch exhaust gas passages 2a and 2b by switching the switching valve 20.

The same NOx adsorbent 4 as that of the case in FIG. 1 is arranged within each of the branch exhaust gas passages 2a and 2b, the combustion apparatus 5 constituted by the fuel nozzle 6, the igniter 7 and the air supply means 15 is arranged in the same manner as FIG. 2 in the exhaust downstream side of each of the NOx adsorbing substances 4, and the over-rich combustion region X1 and the lean fuel combustion region X2 are formed in the exhaust gas upstream side of the air supply means 15, in the actuated state of the combustion apparatus 5.

The adsorbent desorbing means 3 is constituted by an adsorbent desorbing fuel nozzle (burner) 31, an adsorbent desorbing igniter 32 and an adsorbent desorbing air supply means 33. The adsorbent desorbing fuel nozzle 31 is connected to the fuel amount regulating apparatus 10, and the adsorbent desorbing air supply means 33 is connected to the air amount regulating apparatus 16. The other structures as the same as the structures in FIG. 2, and the same reference numerals are attached to the same parts and portions.

In the case of operating the internal combustion engine 1, it is possible to utilize one of both the branch exhaust gas passages 2a and 2b as the exhaust gas discharge flow path of the internal combustion engine 1 by switching the exhaust gas flow path by means of the switching valve 20. The state in FIG. 3 switches the switching valve 20 to the second branch exhaust gas passage 2b, utilizes the second branch exhaust gas passage 2b as the flow path of the exhaust gas, and utilizes the first branch exhaust gas passage 2a for the regenerating operation.

In the state in FIG. 3, in the second branch exhaust gas passage 2b under the normal operation state, the combustion apparatus 5 and the adsorbed substance desorbing means 3 stop, and the NOx in the exhaust gas is adsorbed to the NOx adsorbent 4. On the other hand, in the first branch exhaust gas passage 2a under the regenerating operation state, the combustion apparatus 5 and the adsorbed substance desorbing means 3 are actuated, and the fuel from the fuel nozzle 31 is burned by the air from the air supply means 33 by means of the adsorbed substance desorbing means 3, thereby supplying the high-temperature exhaust gas to the NOx adsorbent 4, desorbing the adsorbed NOx from the NOx adsorbent 4, and reducing and removing in the over-rich combustion region X1 of the combustion apparatus 5.

As shown in FIG. 3, the exhaust gas from the internal combustion engine 1 is interrupted, and the first branch exhaust gas passage 2a in the regenerating operation state becomes in a state of being independently actuated from the second branch exhaust gas passage 2b in the normal operation state, and is operated so as to regenerate on the basis of the fuel supply and the air supply from the adsorbed substance desorbing means 3. Accordingly, it is possible to set the air amount for desorbing the adsorbed substance and for the combustion apparatus regardless of the amount of the exhaust gas from the internal combustion engine 1, and it is possible to save the fuel supply amount from the adsorbed substance desorbing means 3 and the fuel supply amount in the combustion apparatus 5.

The NOx adsorbing amount of the NOx adsorbent 4 in the second branch exhaust gas passage 2b reaches a predetermined amount (for example, a saturated amount), the switching valve 20 is switched to the first branch exhaust gas passage 2a side so as to stop the combustion apparatus 5 and the adsorbed substance desorbing means 3 within the first branch exhaust gas passage 2a, and set the combustion apparatus 5 and the adsorbed substance desorbing means 3 in the second branch exhaust gas passage 2b in an actuated state. In other words, the normal operation is executed in the first branch exhaust gas passage 2a, and the regenerating operation is executed simultaneously in the second branch exhaust gas passage 2b.

As mentioned above, in the exhaust gas purifier in the branch type exhaust gas passage, it is possible to execute the regenerating operation of the remaining branch exhaust gas passage while executing the normal operation of the internal combustion engine 1 by utilizing one branch exhaust gas passage, and it is not necessary to specially secure a time for the regenerating operation.

Fourth Embodiment of the Invention

Figure 4:
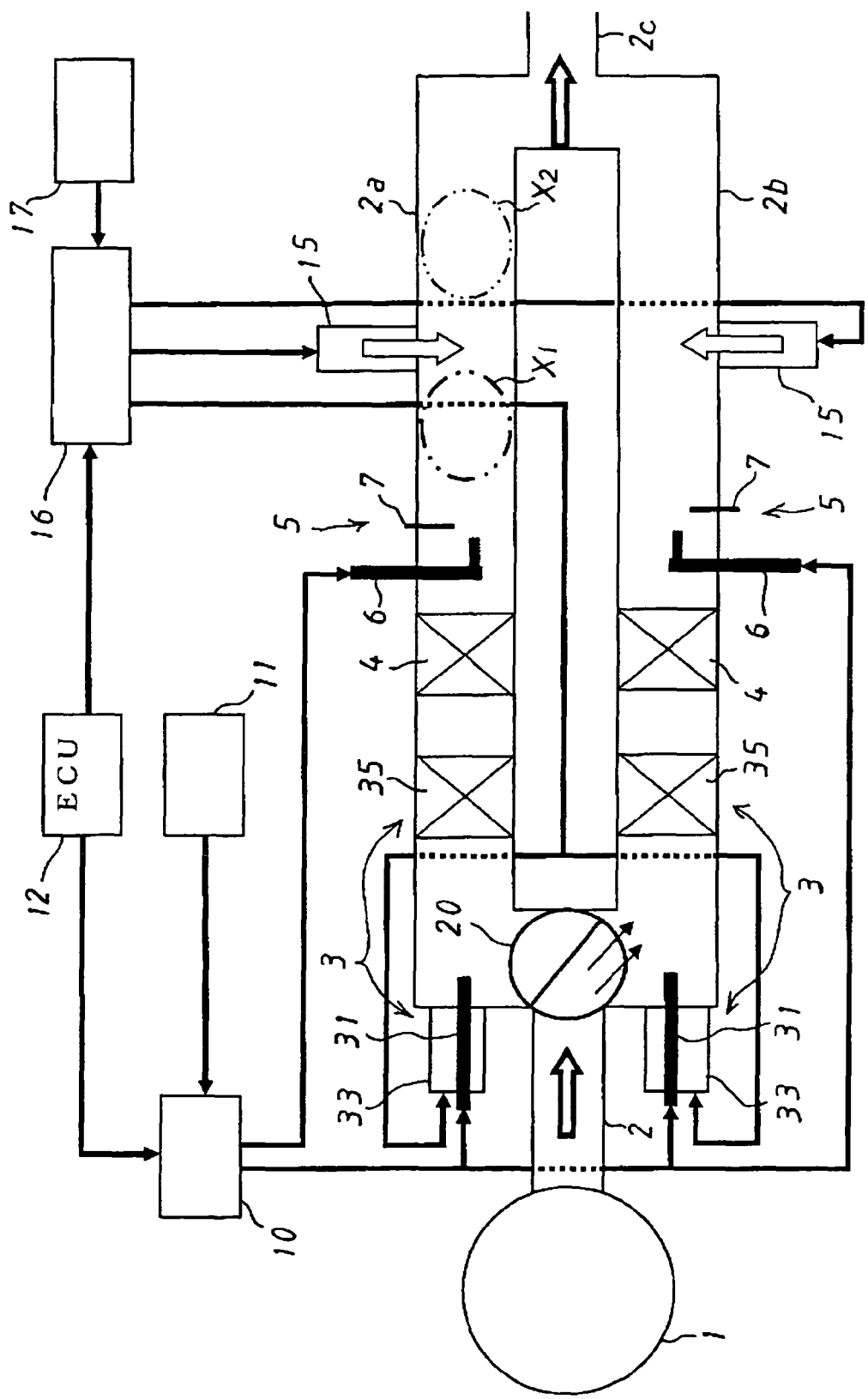
FIG. 4 is a schematic view showing a fourth embodiment in accordance with the present invention.

FIG. 4 shows a fourth embodiment in accordance with the present invention. The fourth embodiment is based on the exhaust gas purifier provided in the branch type exhaust gas passage shown in FIG. 3, and is provided with the fuel nozzle 31, the air supply means 33 and an oxidizing catalyst 35 as the adsorbed substance desorbing means 3. The other structures are the same as those in FIG. 3, and the same reference numerals are attached to the same parts and portions.

An operation is basically the same as that of the case in FIG. 3 mentioned above, however, the fuel supplied from the fuel nozzle 31 of the adsorbed substance desorbing means 3 is oxidized on the oxidizing catalyst 35 so as to generate heat, and the NOx of the NOx adsorbent 4 is desorbed by the heat.

Fifth Embodiment of the Invention

Figure 5:
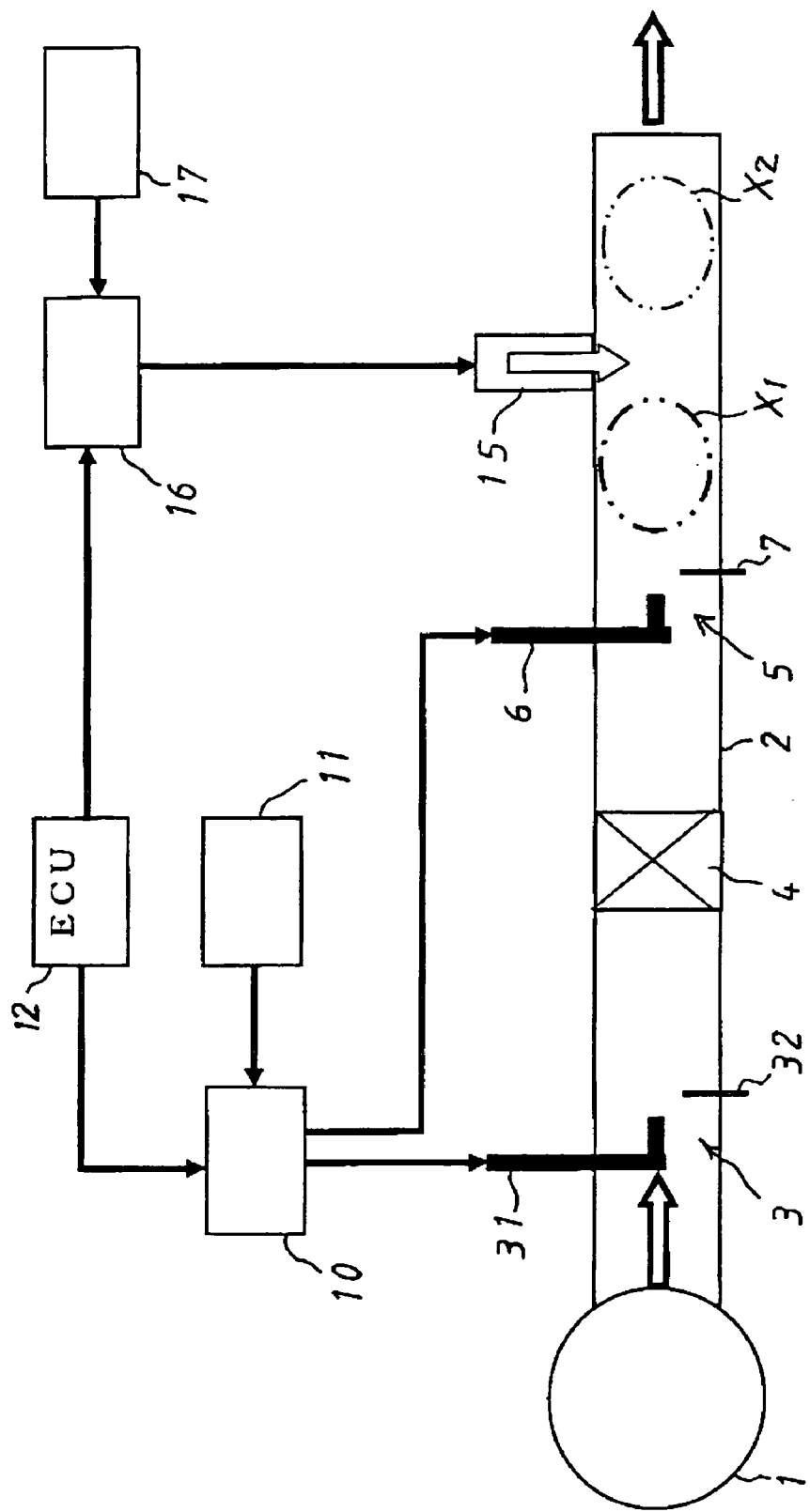
FIG. 5 is a schematic view showing a fifth embodiment in accordance with the present invention.

FIG. 5 shows a fifth embodiment in accordance with the present invention. The fifth embodiment is based on the exhaust gas purifier provided in the single type exhaust gas passage shown in FIG. 1, and is structured such that the fuel nozzle 6, the igniter 7 and the air supply means 15 are provided as the combustion apparatus 5 in the same manner as FIG. 2 mentioned above, the over-rich combustion region X1 is formed in the exhaust gas upstream side of the air supply means 15, and the lean fuel combustion region X2 is formed in the exhaust gas downstream side of the air supply means 15. Further, the fuel nozzle 31 and the igniter 32 are provided as the adsorbed substance desorbing means 3. The other structures are the same as the structures in FIGS. 1 and 2, and the same reference numerals are attached to the same parts and portions.

An operation is basically the same as that of the FIGS. 1 and 2, however, since the combustion is utilized as the adsorbed substance desorbing means 3, it is possible to change the exhaust gas to a high temperature in a moment of time, and it is possible to flexibly correspond to various conditions by regulating the fuel supply amount and the air supply amount of the adsorbed substance desorbing means 3.

Sixth Embodiment of the Invention

Figure 6:
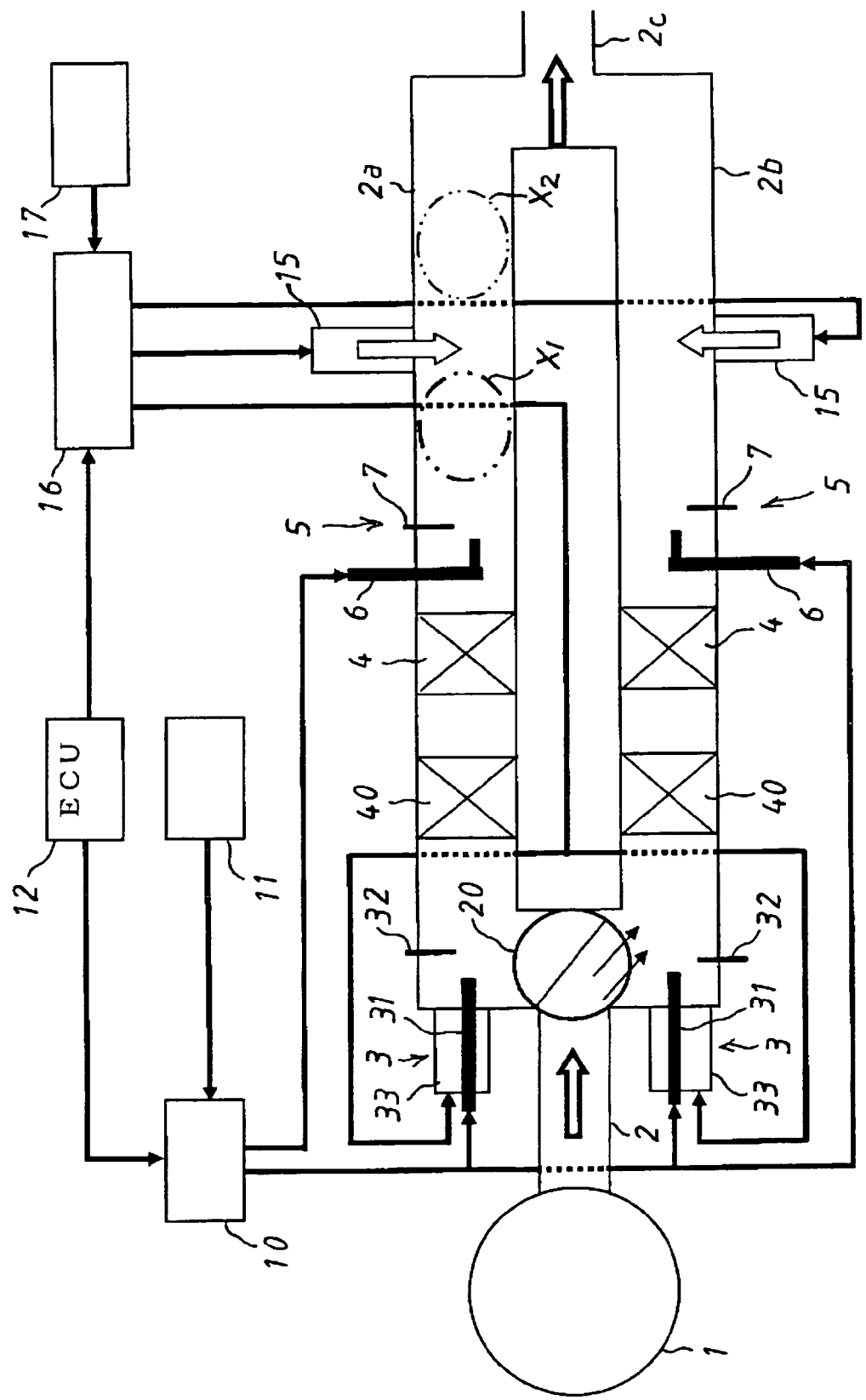
FIG. 6 is a schematic view showing a sixth embodiment in accordance with the present invention.

FIG. 6 shows a sixth embodiment in accordance with the present invention. The sixth embodiment is based on the exhaust gas purifier provided in the branch type exhaust gas passage shown in FIG. 3 mentioned above, and each of the branch exhaust gas passages 2a and 2b is structured such that a fine particle filter 40 is arranged between the adsorbed substance desorbing means (the combustion apparatus) 3 and the adsorbent 4, in addition to the basic structure. The other structures are the same as the structures in FIG. 3, and the same reference numerals are attached to the same parts and portions.

An operation is basically the same as that of the case in FIG. 3 mentioned above, however, since the fine particle filter 40 is arranged in the upstream side of the NOx adsorbent 4, it is possible to flow the exhaust gas from which the particulate substance is removed by the fine particle filter 40 in the NOx adsorbent 4, at a time of the normal operation (at a time of being utilized as the exhaust gas flow path), and it is possible to prevent the adsorbing rate of the NOx by the NOx adsorbent 4 from being lowered.

In the normal operation, if the adsorbed amount of the particulate substance becomes in the saturated state and the back pressure is increased, or the NOx adsorbing amount reaches the predetermined amount (for example, the saturated amount), the fine particle filter 40 is regenerated by switching to the regenerating operation, and burning and removing the particulate substance on the basis of the combustion of the adsorbed substance desorbing means 3, and the NOx adsorbent 4 is simultaneously regenerated by desorbing the NOx in the NOx adsorbent 4.

In this case, the fine particle filter 40 is preferably structured such as to have the function of only capturing the particulate substance, however, may be structured such as to include the catalyst having the oxidizing operation and have a function capable of continuously oxidizing the particulate substance.

Seventh Embodiment of the Invention

Figure 7:
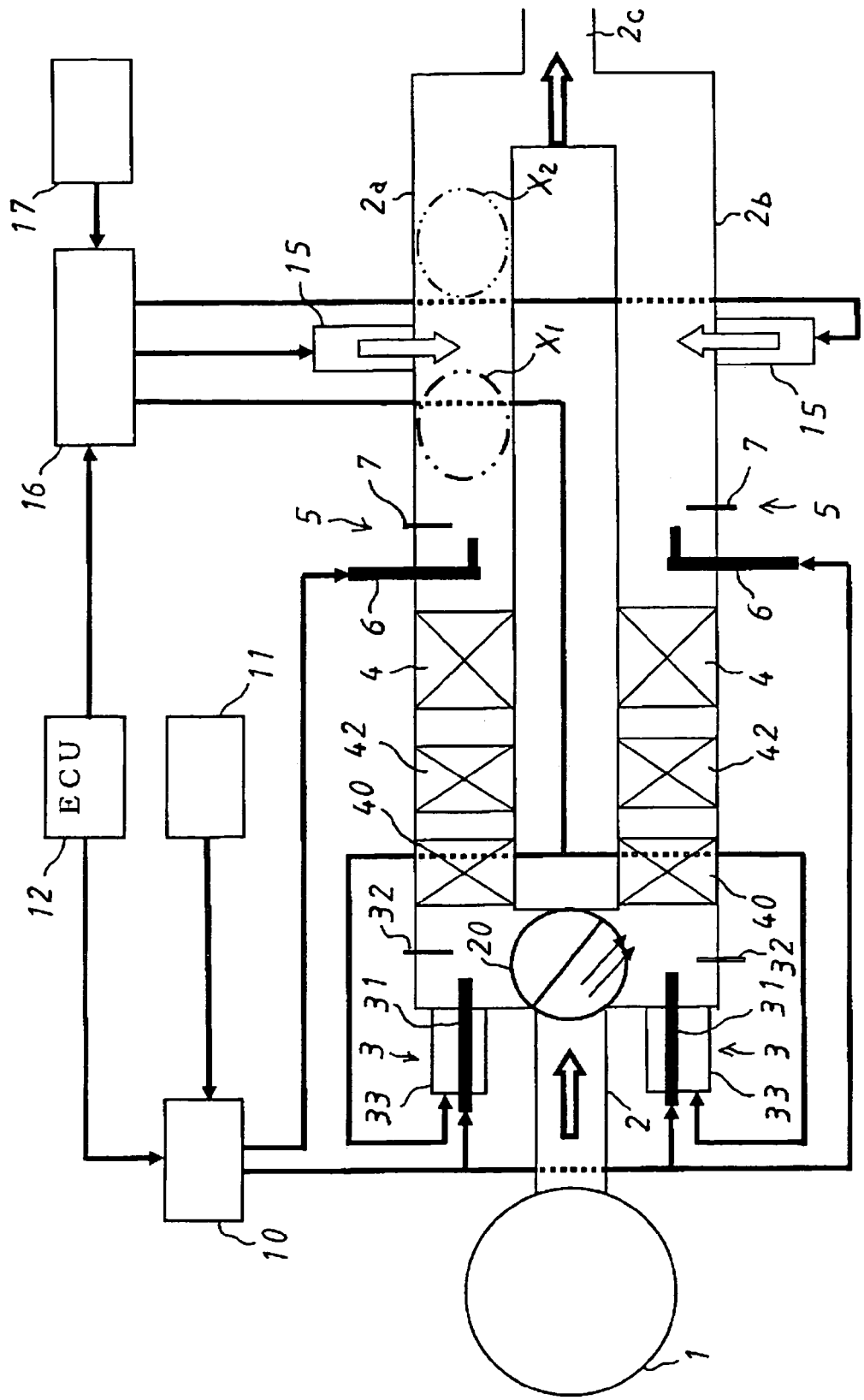
FIG. 7 is a schematic view showing a seventh embodiment in accordance with the present invention.

FIG. 7 shows a seventh embodiment in accordance with the present invention. The seventh embodiment is structured such that an SOx adsorbent 42 is added to the exhaust gas purifier provided in the branch type exhaust gas passage shown in FIG. 6 mentioned above. The SOx adsorbent 42 is arranged between the fine particle filter 40 and the NOx adsorbent 4, within each of the branch exhaust gas passages 2a and 2b. The other structures are the same as the structures in FIG. 6 (and FIG. 3), and the same reference numerals are attached to the same parts and portions. The SOx adsorbent 42 operates without problem even if the SOx adsorbent 42 is arranged in the upstream side of the fine particle filter 40.

An operation is basically the same as that of the case in FIG. 3 mentioned above, however, the NOx and the SOx are efficiently adsorbed respectively at a time of the normal operation, and it is possible to prevent the adsorbing rate of the NOx by the NOx adsorbent 4 from being lowered.

The SOx adsorbed to the SOx adsorbent 42 at a time of the normal operation is desorbed on the basis of a combustion heat of the adsorbed substance desorbing means 3 at a time of the regenerating operation, whereby the SOx adsorbent 42 is regenerated.

Eighth Embodiment of the Invention

Figure 8:
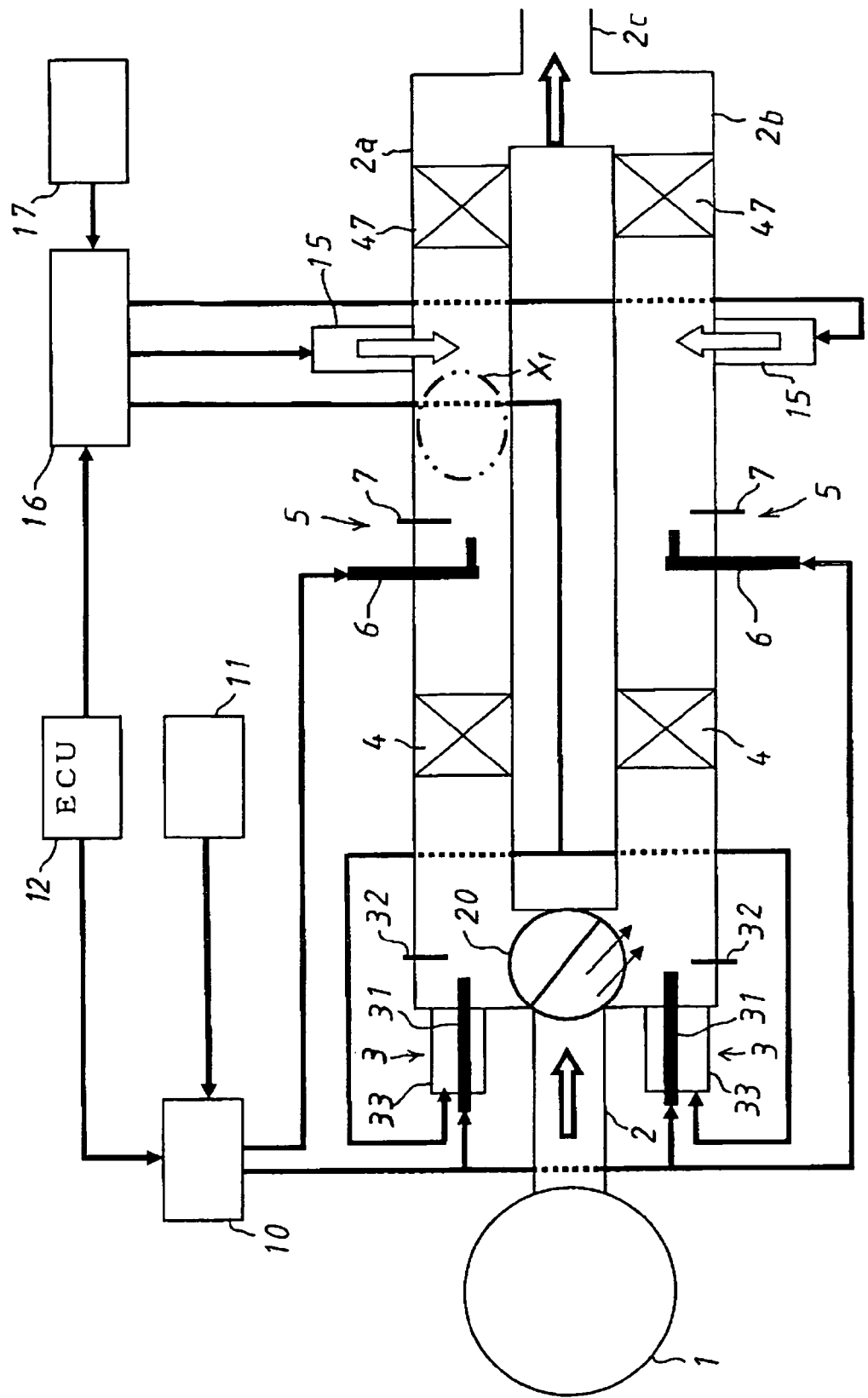
FIG. 8 is a schematic view showing an eighth embodiment in accordance with the present invention.

FIG. 8 shows an eighth embodiment in accordance with the present invention. The eighth embodiment is based on the exhaust gas purifier provided in the branch type exhaust gas passage shown in FIG. 3 mentioned above, and is structured such that an oxidizing catalyst 47 is arranged in the downstream side of the air supply means 15 of the combustion apparatus 5 in place of forming the lean fuel combustion region, in the basic structure. The other structures are the same as the structures in FIG. 3, and the same reference numerals are attached to the same parts and portions.

Since the oxidizing catalyst 47 is arranged in place of the lean fuel combustion region, it is possible to oxide and remove the unburned combustible such as HC, CO or the like even in the case that the temperature is comparatively low.

Ninth Embodiment of the Invention

Figure 9:
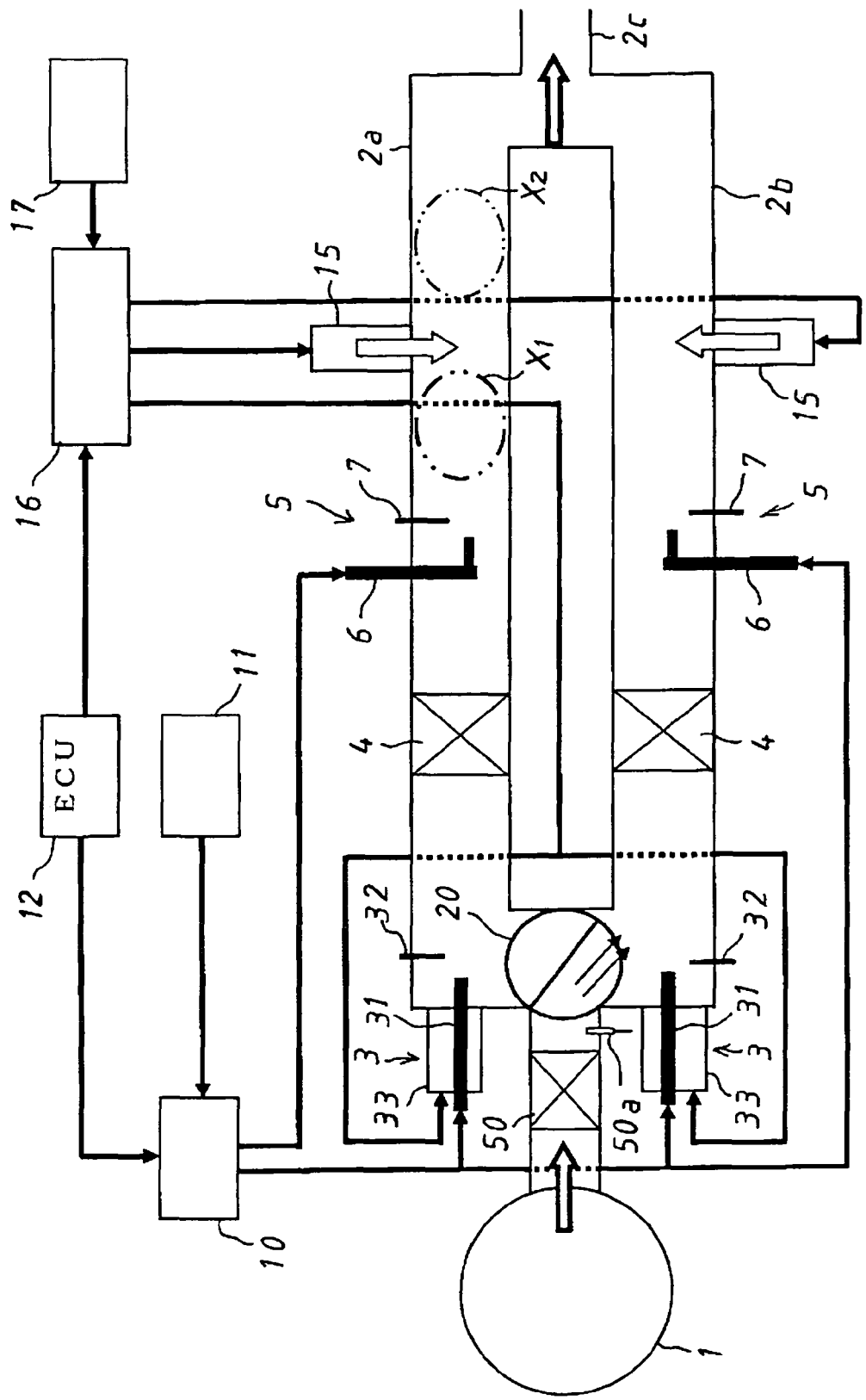
FIG. 9 is a schematic view showing a ninth embodiment in accordance with the present invention.

FIG. 9 shows a ninth embodiment in accordance with the present invention. The ninth embodiment is based on the exhaust gas purifier provided in the branch type exhaust gas passage shown in FIG. 3 mentioned above, and is structured such that an exhaust gas cooling means 50 and a temperature sensor 50a are arranged in an upstream side of the switching valve 20, in addition to the basis structure. The temperature sensor 50a is connected to the ECU 12 so as to input a detected temperature. The other structures are the same as the structures in FIG. 3, and the same reference numerals are attached to the same parts and portions.

During the normal operation, the exhaust gas temperature flowing in the NOx adsorbent 4 is measured, and the exhaust gas cooling means 50 is controlled in such a manner that the temperature of the exhaust gas flowing in the NOx adsorbent 4 is kept within a range in which the adsorbing capacity by the NOx adsorbent 4 can be efficiently achieved.

The control temperature of the exhaust gas is controlled in such a manner as to correspond to the NOx adsorbent 4 having various active temperature bands.

Tenth Embodiment of the Invention

Figure 10:
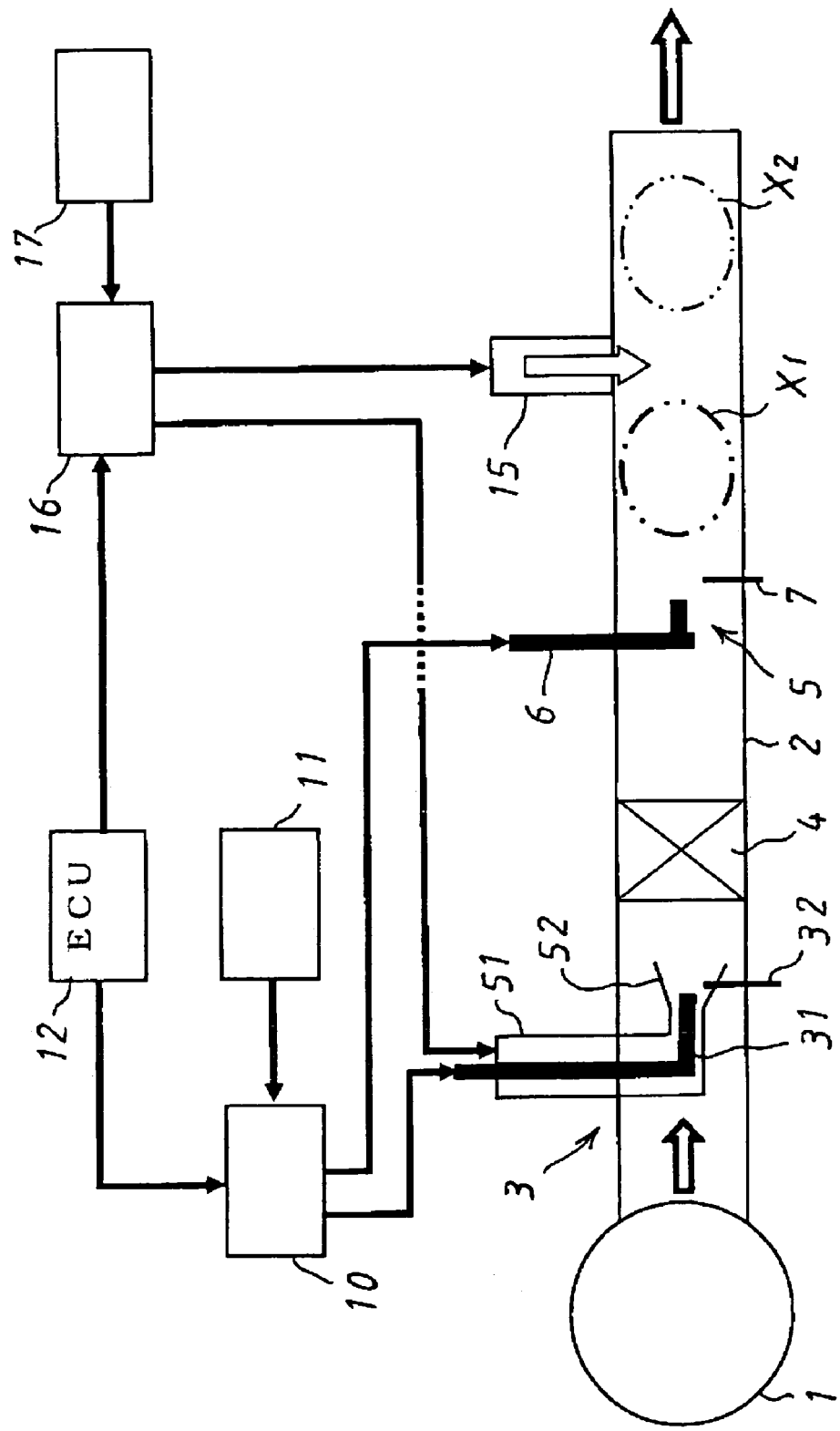
FIG. 10 is a schematic view showing a tenth embodiment in accordance with the present invention.

FIG. 10 shows a tenth embodiment in accordance with the present invention. The tenth embodiment is based on the exhaust gas purifier provided in the single type exhaust gas passage shown in FIG. 1 mentioned above, is provided with the fuel nozzle 6 and the igniter 7 as the combustion apparatus 5 in the same manner as FIG. 1 mentioned above, and is additionally provided with the air supply means 15 in the exhaust gas downstream side of the fuel nozzle 6 in the same manner as FIG. 2, whereby the over-rich combustion region X1 is formed in the exhaust gas upstream side of the air supply means 15, and the lean fuel combustion region X1 is formed in the exhaust gas downstream side of the air supply means 15. Further, it is provided with the fuel nozzle 31 and the igniter 32 as the adsorbed substance desorbing means 3 in the same manner as FIG. 5 mentioned above, and is provided with the air supply means 51 and the flame holding mechanism 52. The other structures are the same as the structures in FIGS. 1, 2 and 5, and the same reference numerals are attached to the same parts and portions.

During the regenerating operation, the frame from the fuel nozzle 31 is held by partially isolating the exhaust gas flow from the exhaust gas upstream side, and delaying the flow rate or forming a back flow region (vortex), by the frame holding mechanism 52.

It is possible to stably burn the exhaust gas so as to keep the NOx desorbing effect by holding the frame as mentioned above, for example, under a condition that the residual oxygen concentration of the exhaust gas in the internal combustion engine is low.

In this case, the frame holding mechanism 52 can be structured such that an exhaust gas circulation region is formed by arranging a swirling vane and swirling the exhaust gas. Further, the structure can be made such that a high oxygen concentration region is formed in a leading end portion of the fuel nozzle 31 by supplying a small amount of air to a portion near the leading end portion of the fuel nozzle 31 by the air supply means 51 in FIG. 10.

Eleventh Embodiment of the Invention

Figure 11:
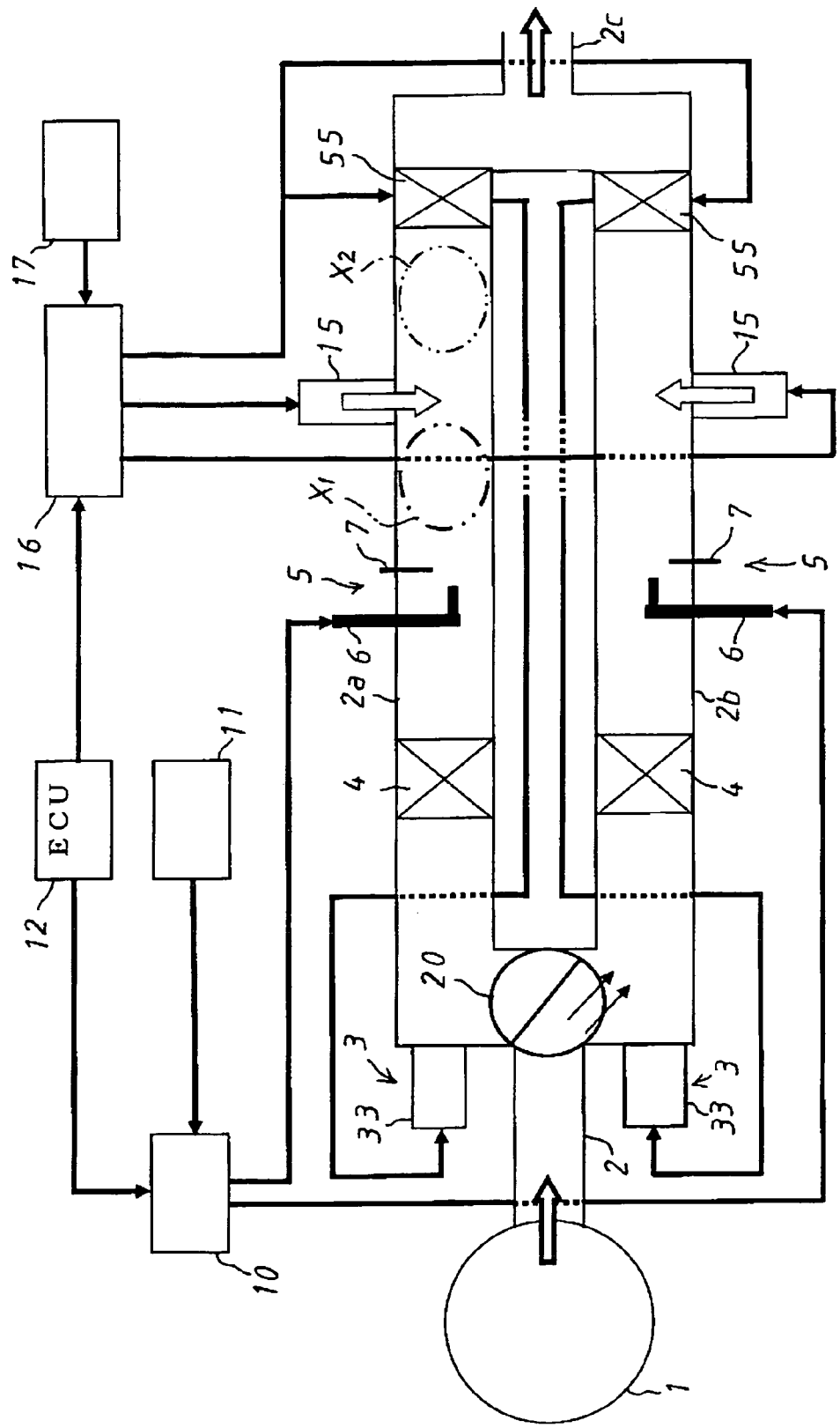
FIG. 11 is a schematic view showing an eleventh embodiment in accordance with the present invention.

FIG. 11 shows an eleventh embodiment in accordance with the present invention. The eleventh embodiment is based on the exhaust gas purifier provided in the branch type exhaust gas passage shown in FIG. 3 mentioned above, and is structured such that only the air supply means 33 is provided as the adsorbed substance desorbing means 3, a heat exchanger 55 is arranged in a downstream side of the lean fuel combustion region X2 of the combustion apparatus 5, and the heat exchanger 55 is connected to the air supply means 33 of the adsorbed substance desorbing means 3, in the basic structure. The other structures are the same as the structures in FIG. 3, and the same reference numerals are attached to the same parts and portions.

In other words, the NOx in the NOx adsorbent 4 is desorbed at a time of the regenerating operation, by exchanging the exhaust gas heated up in the lean fuel combustion region X2 of the combustion apparatus 5 for the air from the air amount regulating apparatus 16 by the heat exchanger 55, and supplying the high-temperature air to an exhaust gas upstream end portion of the branch exhaust gas passage 2a (or 2b) via the air supply means 33 of the adsorbed substance desorbing means 3.

In accordance with this structure, the igniter and the fuel nozzle are not necessary as the adsorbed substance desorbing means 3, and it is possible to achieve a compact structure. Further, a frame temperature in the over-rich combustion region X1 becomes higher, and the NOx reducing rate is improved.

Twelfth Embodiment of the Invention

Figure 12:
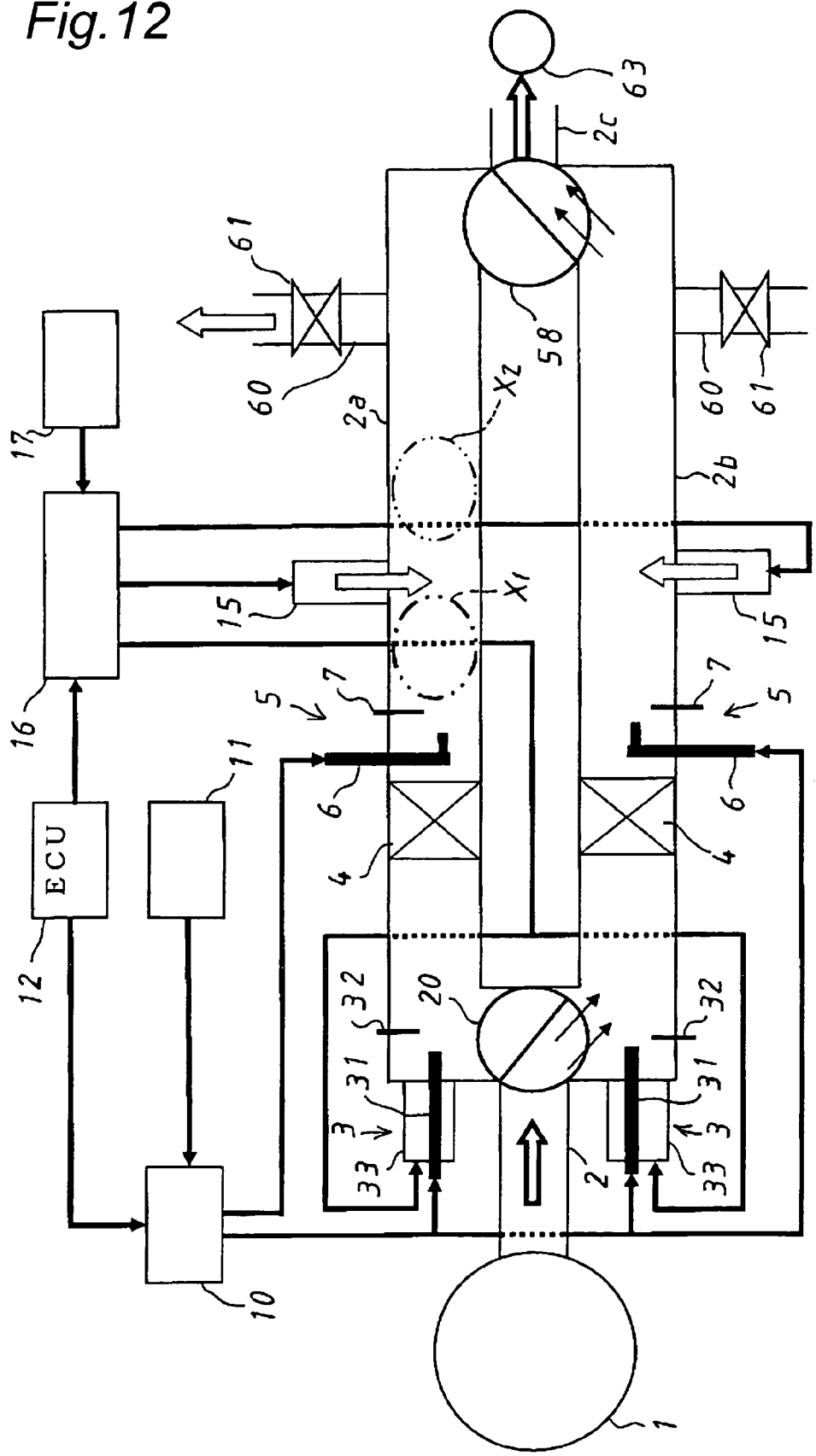
FIG. 12 is a schematic view showing a twelfth embodiment in accordance with the present invention.

FIG. 12 shows a twelfth embodiment in accordance with the present invention. The twelfth embodiment is based on the exhaust gas purifier provided in the branch type exhaust gas passage shown in FIG. 3 mentioned above, and is structured such that an outlet side switching valve 58 is arranged in an exhaust gas downstream side assembled portion of the branch exhaust gas passages 2a and 2b, an atmospheric air releasing passage (an atmospheric air releasing portion) 60 is formed in a downstream side of each of the combustion apparatuses 5 in a branched manner, and an opening and closing valve 61 is provided in each of the atmospheric air passages 60, in addition to the basis structure. The exhaust gas passage 2c in the downstream side of the outlet side switching valve 58 is connected, for example, to an exhaust gas boiler 63, thereby utilizing a waste heat of the exhaust gas. The other structures are the same as the structures in FIG. 3, and the same reference numerals are attached to the same parts and portions. In this case, as the NOx adsorbent 4, a substance capable of sufficiently adsorbing the SOx is utilized.

A state shown in FIG. 12 corresponds to a state of switching both the switching valves 20 and 59 to the second branch exhaust gas passage 2b side, releasing the atmospheric air releasing passage 60 of the first branch exhaust gas passage 2a and closing the atmospheric air releasing passage 60 of the second branch exhaust gas passage 2b, the combustion apparatus 5 and the adsorbed substance desorbing means 3 in the first branch exhaust gas passage 2a are in the actuated state for the regenerating operation, and the combustion apparatus 5 and the adsorbed substance desorbing means 3 in the second branch exhaust gas passage 2b are in the non-actuated state as the exhaust gas flow path from the internal combustion engine 1.

In the case of operating the internal combustion engine by using the sulfur component containing fuel in the state in FIG. 12, the SOx is desorbed together with the NOx adsorbed to the NOx adsorbent 4 at a time of the preceding operation, in the first branch exhaust gas passage 2a in the reproducing operation state, so that there is a possibility that the exhaust gas boiler 63 is poisoned if the fuel is utilized in the exhaust gas boiler 63 as it is. Accordingly, the exhaust gas is not utilized in the exhaust gas boiler 63 by being discharged to the atmospheric air from the atmospheric air releasing passage 60. On the other hand, since the SOx is adsorbed to the NOx adsorbent 4 in the second branch exhaust gas passage 2b in the normal operation state, the SOx is hardly contained in the exhaust gas in the downstream side of the NOx adsorbent 4, and the exhaust gas is utilized for the exhaust gas boiler 63. Accordingly, there is no fear that the exhaust gas boiler 63 is corroded by the acid or the like caused by the SOx, it is possible to recover the heat from the exhaust gas to the low temperature, and a heat recovery rate is widely improved.

Thirteenth Embodiment of the Invention

Figure 13:
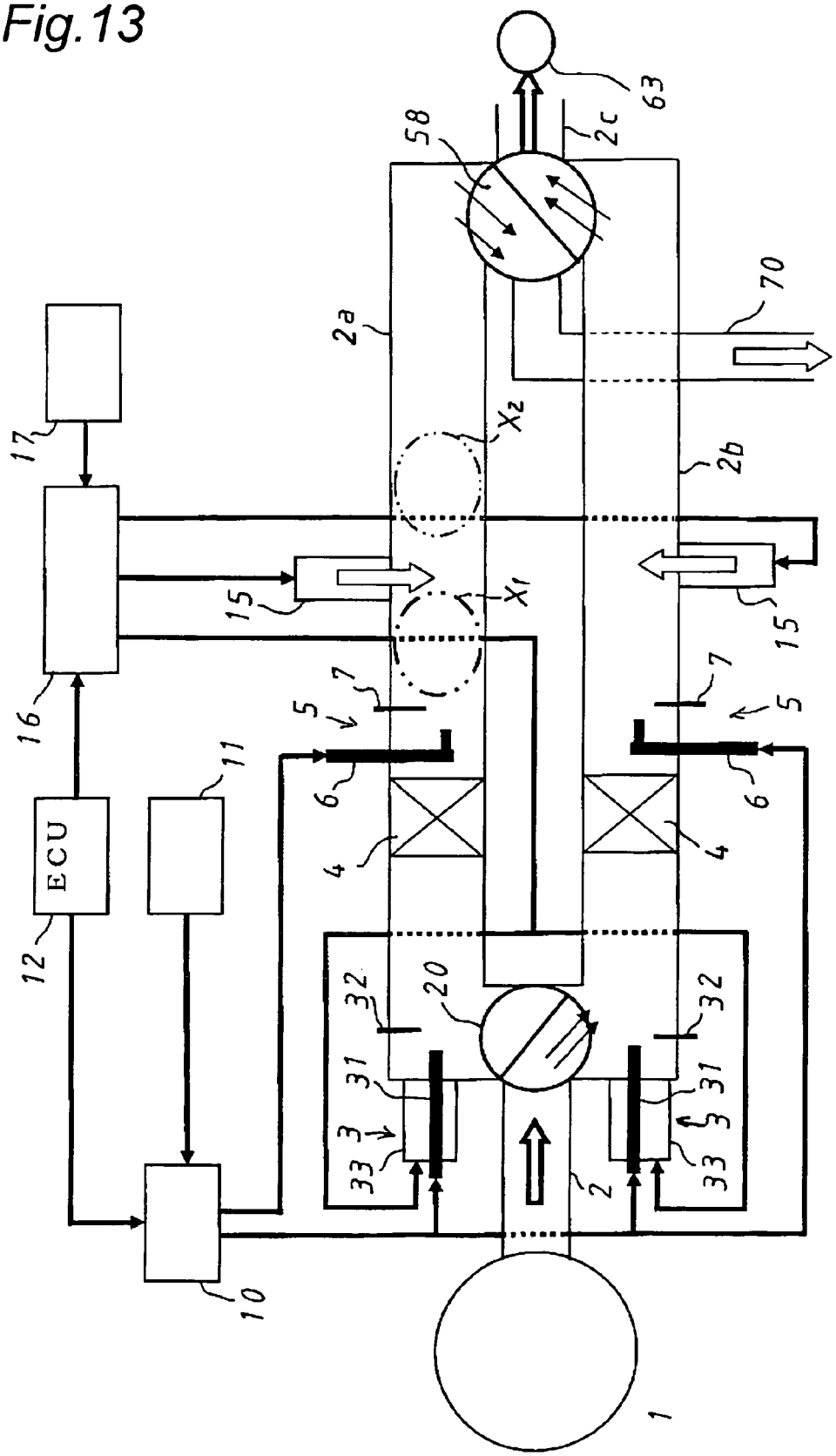
FIG. 13 is a schematic view showing a thirteenth embodiment in accordance with the present invention.

FIG. 13 shows a thirteenth embodiment in accordance with the present invention. The thirteenth embodiment corresponds to a modified embodiment of the exhaust gas purifier provided in the branch type exhaust gas passage shown in FIG. 12 mentioned above, and is structured such that the exhaust gas passage 2c connected to the exhaust gas boiler 63 and an atmospheric air passage 70 communicating with the atmospheric air are provided in the outlet side switching valve 58 in the exhaust gas downstream side assembled portion, in place of forming the atmospheric air releasing passage 60 in each of the branch exhaust gas passages 2a and 2b as shown in FIG. 12. In other words, in the first and second branch exhaust gas passages 2a and 2b, the branch exhaust gas passage (the second branch exhaust gas passage 2b in FIG. 13) in the normal operation side communicating with the internal combustion engine 1 is connected to the exhaust gas boiler 63, and the branch exhaust gas passage (the first branch exhaust gas passage 2a in FIG. 13) in the regenerating operation side is communicated with the atmospheric air passage 70. In accordance with this structure, the structure can be simplified in comparison with the structure in which the atmospheric air releasing passage 60 and the opening and closing valve 61 are provided respectively in the branch exhaust gas passages 2a and 2b as shown in FIG. 12. An operation thereof is the same as the case in FIG. 12.

Fourteenth Embodiment of the Invention

Figure 14:
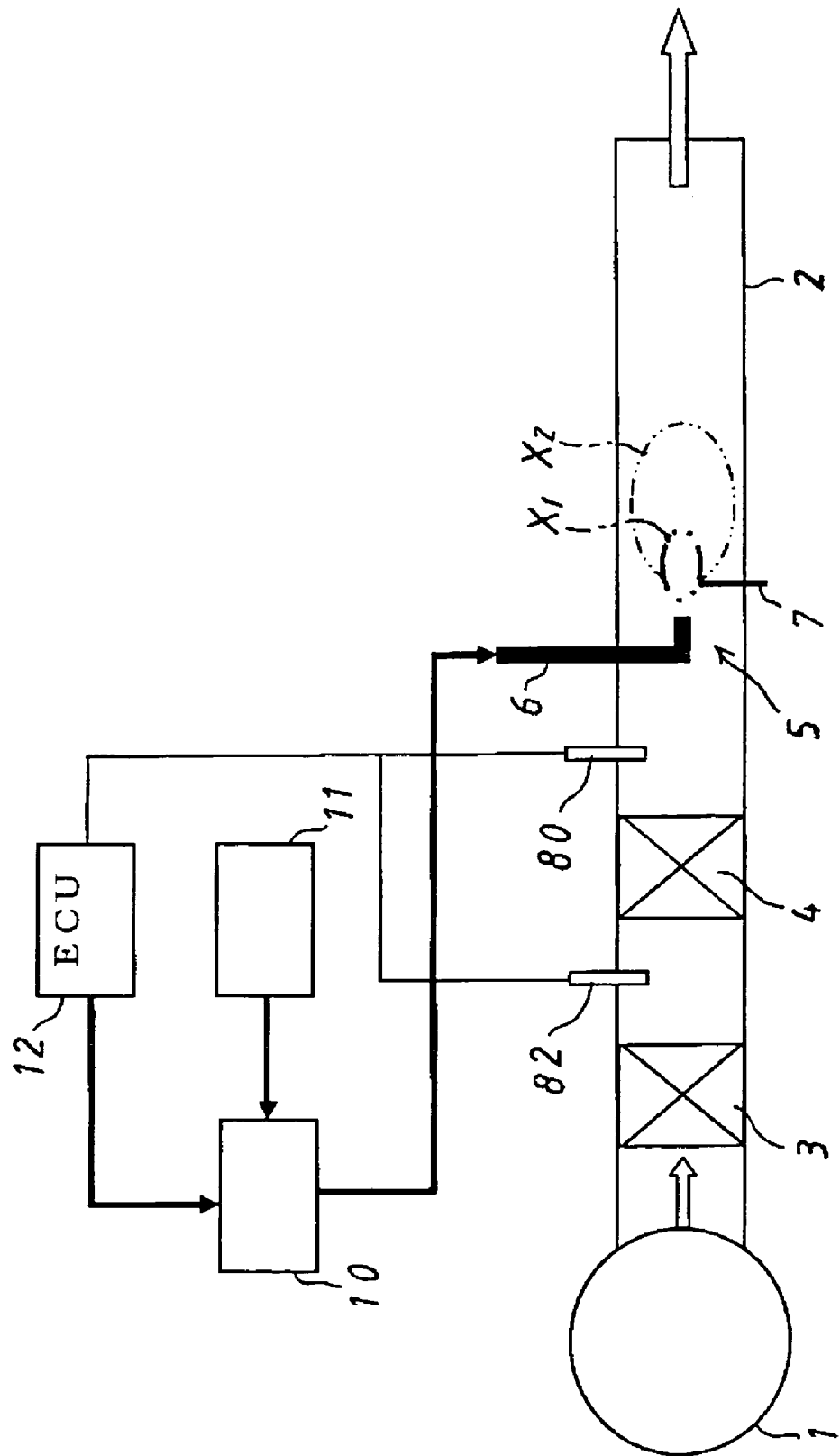
FIG. 14 is a schematic view showing a fourteenth embodiment in accordance with the present invention.

FIG. 14 shows a fourteenth embodiment in accordance with the present invention. The fourteenth embodiment is based on the exhaust gas purifier provided in the single type exhaust gas passage shown in FIG. 1 mentioned above, and is structured such that a suitable control can be executed by arranging various sensors in the single exhaust air passage type basic structure. Accordingly, the same reference numerals are attached to the same parts and portions in FIG. 1. In FIG. 14, an adsorbed amount detecting (estimating) sensor 80 is arranged in the downstream side of the NOx adsorbent 4, a temperature sensor 82 is arranged in the upstream side of the NOx adsorbent 4, each of the sensors 80 and 82 is connected to the ECU 12, each of the measured values is input to the ECU 12, and the following control is executed on the basis of the input value.

At a time of the normal operation, the NOx in the exhaust gas is adsorbed by the NOx adsorbent 4 as mentioned above, and the unburned compatible such as CO, HC or the like is oxidized, for example, by the catalyst component contained in the NOx adsorbent 4 and having the oxidizing operation so as to be defused. If the NOx adsorbed amount reaches a predetermined (for example, a saturated) adsorbed amount by being measured by the adsorbed amount detecting sensor 80, the adsorbed substance desorbing means 3 is actuated on the basis of the command from the ECU 12, and the NOx is desorbed, and reduced and removed in the over-rich combustion region X1 of the downstream fuel apparatus 5, for example, by heating up the NOx adsorbent 4.

Further, the CO or the HC discharged from the internal combustion engine 1 or the combustion equipment, or the CO, the HC or the particulate substance generated in the over-rich combustion region X1 is oxidized and removed in the lean fuel combustion region X2 formed outside the over-rich combustion region X1 of the combustion apparatus 5.

Further, in the case that the shape of the NOx adsorbent 4 is formed in a shape suitable for capturing the particulate substance, the particulate substance is captured by the NOx adsorbent 4 during the normal operation, however, can be burned and removed by heating up the NOx adsorbent 4 as mentioned above, in the regenerating operation.

Further, in the case that the SOx is contained in the exhaust gas, a part of the SOx is adsorbed to the NOx adsorbent 4, however, the NOx adsorbent 4 is regenerated by heating the NOx adsorbent 4 to the SOx desorbing temperature or desorbing the SOx under the reducing atmosphere at a time of the regenerating operation. In this case, the NOx adsorbent 4 itself can be formed by a substance to which the SOx is hard to be adsorbed, whereby it is possible to prevent the NOx adsorbent 4 from being poisoned.

Fifteenth Embodiment of the Invention

Figure 15:
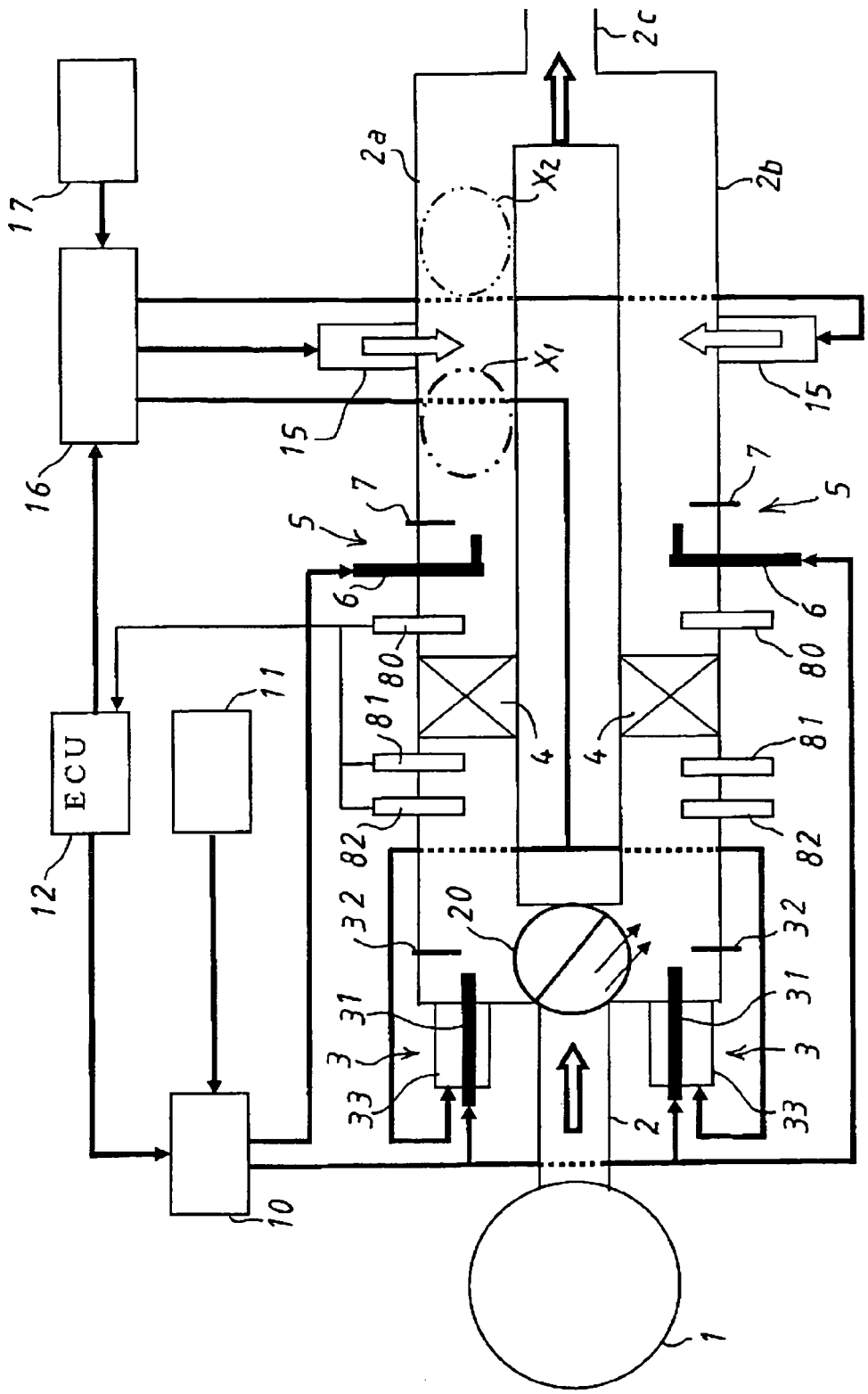
FIG. 15 is a schematic view showing a fifteenth embodiment in accordance with the present invention.

FIG. 15 shows a fifteenth embodiment in accordance with the present invention. The fifteenth embodiment is based on the exhaust gas purifier provided in the branch type exhaust gas passage shown in FIG. 3 mentioned above, and is structured such that a suitable control can be executed by arranging a sensor measuring a temperature or a pressure in each of the positions in the basic structure. This corresponds to an example in which an adsorbed amount estimating sensor 80 is arranged in the downstream side of the NOx adsorbent 4, and a pressure sensor 81 and a temperature sensor 82 are arranged in the upstream side of the NOx adsorbent 4. Each of the sensors 80, 81 and 82 is connected to the ECU 12, and is structured such as to input the measured value to the ECU 12.

One of two branch exhaust gas passages 2a and 2b is utilized as the flow path of the exhaust gas from the internal combustion engine 1 for the normal operation, and the other is operated for regeneration in the mean while. For example, the exhaust gas in the internal combustion engine 1 is circulated through the second branch exhaust gas passage 2b by switching the switching valve 20 to the second branch exhaust gas passage 2b side as shown in FIG. 15, and the adsorbed substance desorbing means 3 and the combustion apparatus 5 are actuated in the first branch exhaust gas passage 2a in the mean while.

In the second branch exhaust gas passage 2b in the normal operation state, the adsorbed substance desorbing means 3 and the combustion apparatus 5 stop, and the NOx in the exhaust gas is adsorbed by the NOx adsorbent 4. Further, the unburned combustible such as CO, HC or the like is oxidized, for example, by the catalyst contained in the NOx adsorbent 4 and having the oxidizing operation so as to be defused. On the other hand, in the first branch exhaust gas passage 2a, the adsorbed substance desorbing means 3 is actuated, whereby the NOx is desorbed from the NOx adsorbent 4, and is reduced and removed in the over-rich combustion region X1 in the downstream side of the exhaust gas, for example, by heating the NOx adsorbent 4.

During the normal operation utilizing the second branch exhaust gas passage 2b mentioned above, if the NOx adsorbed amount in the second branch exhaust gas passage 2b reaches a predetermined (for example, a saturated) adsorbed amount by being measured by the adsorbed amount detecting sensor 80, the switching valve 20 is changed to the first branch exhaust gas passage 2a side on the basis of the command from the ECU 12, and the second branch exhaust gas passage 2b is set to the regenerating operation state by actuating the adsorbed substance desorbing means 3 and the combustion apparatus 5 in the second branch exhaust gas passage 2b. In parallel with this, the exhaust gas from the internal combustion engine 1 flows in the first branch exhaust gas passage 2a, and the normal operation state is established. In the case that the captured amount of the particulate substance to the NOx adsorbent 4 becomes in the saturated state prior to the adsorbed amount of the NOx during the normal operation, the saturation of the particulate substance is detected by the pressure detecting sensor 81, and the switching valve 20 is switched to the first branch exhaust gas passage 2a side. Accordingly, it is possible to prevent the NOx adsorbing performance from being lowered due to the pressure reduction.

Figure 16:
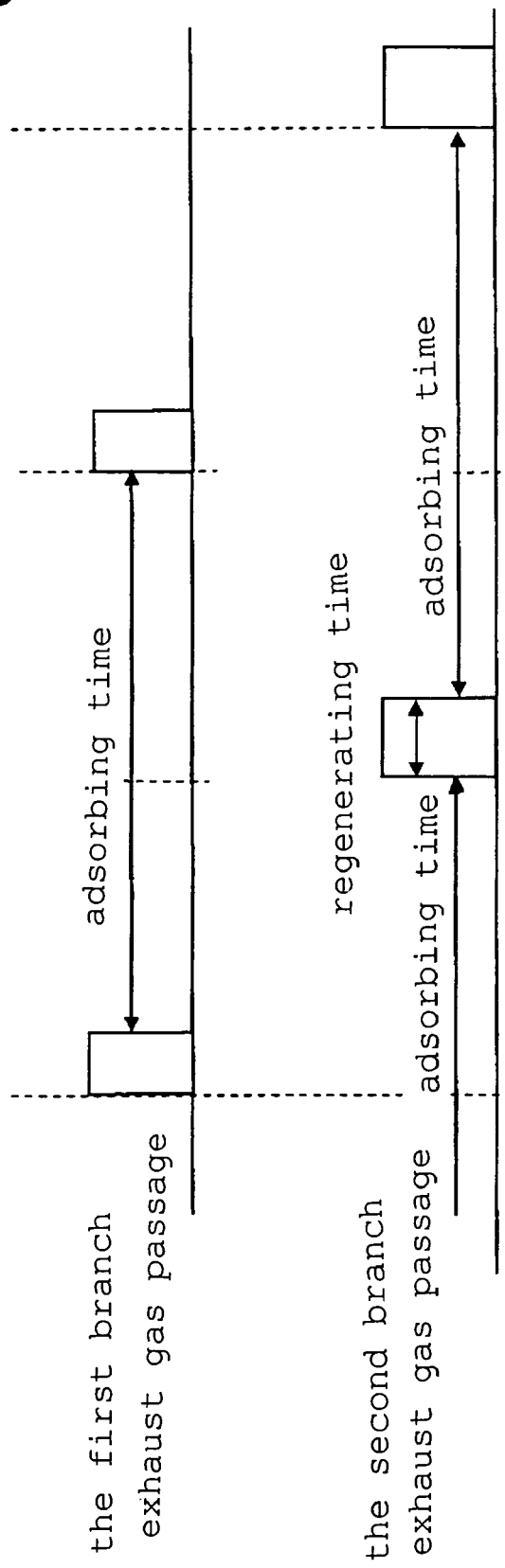
FIG. 16 is a view showing a time relation of operation states between respective branch exhaust gas passages of exhaust gas purifiers provided in branch type exhaust gas passages.

FIG. 16 shows a time elapse of the control of the exhaust gas purifier in FIG. 15, and shows that the other executes the regenerating operation while one of the first branch exhaust gas passage 2a and the second branch exhaust gas passage 2b is utilized for the normal operation so as to adsorb the NOx. In this case, a relation shown in FIG. 16 is applied to all of the exhaust gas purifiers provided in the branch type exhaust gas passage in FIG. 3 or the like.

Other Embodiments of the Invention (1) In the case that the internal combustion engine itself is constituted by an internal combustion engine for a lean combustion, for example, is provided with a supercharger, an air of a compressor in the supercharger can be utilized for each of the air supply means in FIGS. 2 to 15.

(2) As the NOx adsorbent, it is possible to utilize a structure in which the NOx adsorbent is used in a wall of the fine particle filter.

(3) In the exhaust gas purifier provided in the single type exhaust gas passage, in place of specially arranging the adsorbed substance desorbing means 3 within the exhaust gas passage 2 as shown in FIGS. 1 and 2, the structure can be made such as to heat the exhaust gas temperature on the basis of the control of a direct injecting combustion injection valve of the internal combustion engine, thereby heating the NOx adsorbent so as to desorb the NOx. For example, the temperature of the exhaust gas is increased by injecting a secondary fuel in an engine expansion stroke or an exhaust stroke or delaying a fuel injection timing, thereby heating the NOx adsorbent.

(4) In the case that the present invention is applied to the branch type exhaust gas passage such as FIG. 3 or the like, it is possible to apply to the exhaust gas passage which is branched into three or more branch exhaust gas passages. In this case, the remaining branch exhaust gas passages can be regenerated while one branch exhaust gas passage is utilized for the normal operation. Further, it is possible to connect all of the remaining exhaust gas branch passages to the internal combustion engine or the like during the regenerating operation of one exhaust gas passage.

INDUSTRIAL APPLICABILITY

The present invention is utilized as the exhaust gas purifier of the various internal combustion engines such as the diesel engine, the gas engine, the gasoline engine, the gas turbine engine or the like, or the combustion equipment such as the industrial boiler or the like, however, is particularly suitable for the internal combustion engine in which a lot of NOx is contained in the exhaust gas, such as the internal combustion engine operated under the lean combustion. Further, the present invention can be applied to the industrial diesel engine containing the SOx or the like, and is further suitable for the case of reusing the heat of the exhaust gas. It is possible to reduce the poisoning by the SOx and it is possible to efficiently recover the exhaust heat.

The invention claimed is:

1. An exhaust gas purifier installed in an exhaust passage of an internal combustion engine of a combustion equipment, comprising:
    a nitrogen oxide adsorbent temporarily adsorbing nitrogen oxide, and desorbing said adsorbed nitrogen oxide by a heating or a reducing atmosphere; an adsorbed substance desorbing means arranged in an exhaust gas upstream side of said nitrogen oxide adsorbent and heating the exhaust gas or converting the exhaust gas to the reducing atmosphere; and
    a combustion apparatus arranged in an exhaust gas downstream side of said nitrogen oxide adsorbent and constituted by a fuel supply means and an ignition means,
    wherein the nitrogen oxide adsorbent, the adsorbed substance desorbing means and the combustion apparatus are provided within said exhaust passage.

2. An exhaust gas purifier as claimed in claim 1, wherein said combustion apparatus has an over-rich combustion region burning under an excess fuel condition by the fuel supplied from said fuel supply means and the exhaust gas from said nitrogen oxide adsorbent, and a lean fuel combustion region positioned in an exhaust gas downstream side of said over-rich combustion region and burning under an excessive air condition by the exhaust gas from said over-rich combustion region and the air from an air supply means.

3. An exhaust gas purifier as claimed in claim 1, wherein said exhaust gas passage is branched into a plurality of branch exhaust gas passages, an exhaust gas inlet of each of the branch exhaust gas passages is provided with an exhaust gas isolating means capable of isolating the exhaust gas, and each of the branch passages is provided with said nitrogen oxide adsorbent, the adsorbed substance desorbing means arranged in the exhaust gas upstream side of said nitrogen oxide adsorbent, having the air supply means and heating the air supplied from said air supply means or converting the air to the reducing atmosphere, and said combustion apparatus arranged in the exhaust gas downstream side of said nitrogen oxide adsorbent.

4. An exhaust gas purifier as claimed in claim 1, wherein said adsorbed substance desorbing means has a heating means and a reducing agent supply means.

5. An exhaust gas purifier as claimed in claim 1, wherein said adsorbed substance desorbing means is constituted by a heat generating resistance.

6. An exhaust gas purifier as claimed in claim 1, wherein said adsorbed substance desorbing means is constituted by an adsorbed substance desorbing fuel supply means.

7. An exhaust gas purifier as claimed in claim 1, wherein said adsorbed substance desorbing means has an adsorbed substance desorbing fuel supply means and an oxidizing catalyst arranged in an exhaust gas downstream side from said adsorbed substance desorbing fuel supply means.

8. An exhaust gas purifier as claimed in claim 1, wherein said adsorbed substance desorbing means is constituted by an adsorbed substance desorbing combustion apparatus comprising an air supply means and a fuel supply means.

9. An exhaust gas purifier as claimed in claim 1, wherein a filter capable of capturing a particulate substance contained in the exhaust gas is arranged in an exhaust gas upstream side of said nitrogen oxide adsorbent.

10. An exhaust gas purifier as claimed in claim 1, wherein said nitrogen oxide adsorbent is formed in a shape capable of capturing a particulate substance contained in the exhaust gas.

11. An exhaust gas purifier as claimed in claim 1, wherein a sulfur oxide adsorbent temporarily adsorbing sulfur oxide is arranged in an exhaust gas upstream side of said nitrogen oxide adsorbent.

12. An exhaust gas purifier as claimed in claim 2, wherein each of said air supply means is connected to an outlet portion of a compressor of a supercharger of an internal combustion engine to which the exhaust gas passage is connected so as to utilize a compressed air from said compressor.

13. An exhaust gas purifier as claimed in claim 2, wherein an air supply means for supplying an air, and a catalyst having an oxidizing function are alphabetically arranged in place of the lean fuel combustion region formed in the exhaust gas downstream side of said over-rich combustion region.

14. An exhaust gas purifier as claimed in claim 1, wherein an exhaust gas cooling means is arranged and a temperature sensor measuring a temperature of the exhaust gas coming out of said exhaust gas cooling means is provided, in the exhaust gas upstream side of said adsorbed substance desorbing means.

15. An exhaust gas purifier as claimed in claim 1, wherein at least one of the adsorbed substance desorbing means and the combustion apparatus arranged in the downstream side of the adsorbent corresponding to said adsorbed substance desorbing means is provided with a frame holding mechanism.

16. An exhaust gas purifier as claimed in claim 1, wherein said exhaust gas passage is constituted by an exhaust passage of a compression ignition type internal combustion engine, and said adsorbed substance desorbing means has a fuel injection valve directly injecting a fuel into a cylinder of the internal combustion engine, and is structured such as to inject a secondary fuel by said fuel injection valve in an engine expansion stroke or an exhaust stroke.

17. An exhaust gas purifier as claimed in claim 1, wherein said exhaust gas passage is constituted by an exhaust passage of a compression ignition type internal combustion engine, and said adsorbed substance desorbing means has a fuel injection valve directly injecting a fuel into a cylinder of the internal combustion engine, and is structured such as to slow a fuel injection timing by said fuel injection valve.

18. An exhaust gas purifier as claimed in claim 3, wherein a heat exchanger is arranged in a downstream side of said lean fuel combustion region, and is structured such as to use which is heated by heat exchanged for the exhaust gas from said lean fuel combustion region for the air supply means of said adsorbed substance desorbing means.

19. An exhaust gas purifier as claimed in claim 3, wherein an atmospheric air releasing portion having an opening and closing valve is provided in an exhaust gas downstream side of said lean fuel combustion region in each of said branch exhaust gas passages, each of the branch exhaust gas passages is combined with the downstream side exhaust gas passage in the exhaust gas downstream side portion from the atmospheric air releasing portion, said combined portion is provided with an outlet side switch valve selectively connecting each of the branch exhaust gas passages to the downstream side exhaust gas passage, and the switch valve is switched in such a manner as to circulate the exhaust gas to the downstream side exhaust passage by closing the opening and closing valve in at least one of the branch exhaust gas passages, and the exhaust gas is discharged to the atmospheric air while executing the regenerating operation, by actuating the adsorbed substance desorbing means and the combustion apparatus and opening the opening and closing valve for releasing the atmospheric air in the remaining branch exhaust gas passages, at a time of the operation.

20. A method of controlling the exhaust gas purifier as claimed in claim 1, wherein a temperature detecting means is arranged in an exhaust gas upstream side of said nitrogen oxide adsorbent, an adsorbed amount detecting means for detecting an adsorbed amount by said nitrogen oxide adsorbent is arranged in the exhaust gas downstream side of said nitrogen oxide adsorbent, an adsorbed amount by the nitrogen oxide adsorbent at a time of the normal operation is detected by said adsorbed amount detecting means, the method actuates the combustion apparatus at the same time of or before or behind actuating said adsorbed amount desorbing means at a time when the adsorbed amount reaches a predetermined amount, the method controls such that an air-fuel mixture constituted by the exhaust gas from the nitrogen oxide adsorbent and the fuel supplied from the fuel supply means of the combustion apparatus becomes excess in fuel, in the over-rich combustion region, the method controls such that an air-fuel mixture constituted by the exhaust gas from the over-rich combustion region and the air supplied from the sir supply means becomes excess in air, in the lean fuel combustion region, and the method stops the actuation of said adsorbed substance desorbing means and the combustion apparatus if a state in which all the adsorbed substance of the nitrogen oxide adsorbent is desorbed is detected by said adsorbed amount detecting means, thereby returning to the normal operation state.

21. A method of controlling the exhaust gas purifier as claimed in claim 3, a temperature detecting means is arranged in an exhaust gas upstream side of said nitrogen oxide adsorbent, an adsorbed amount detecting means for detecting an adsorbed amount by the adsorbent is arranged in the exhaust gas downstream side of said nitrogen oxide adsorbent, in each of the branch exhaust gas passages, the exhaust gas from the internal combustion engine or the combustion equipment is flowed in at least one branch exhaust passage, an adsorbed amount by the nitrogen oxide adsorbent at a time of the normal operation is detected by said adsorbed amount detecting means, the method isolates an exhaust gas flow in said branch exhaust gas passages by an exhaust gas isolating means at a time when said adsorbing amount reaches a predetermined amount, the method actuates the combustion apparatus at the same time of or before or behind actuating said adsorbed amount desorbing means, the method controls such that an air-fuel mixture constituted by the exhaust gas from the internal combustion engine or the combustion equipment and the fuel supplied from the fuel supply means of the combustion apparatus becomes excess in fuel, in the over-rich combustion region within said branch exhaust gas passage, the method controls such that an air-fuel mixture constituted by the exhaust gas from the over-rich combustion region and the air supplied from the sir supply means of the combustion apparatus becomes excess in air, in said lean fuel combustion region, the method stops the actuation of said adsorbed substance desorbing means and the combustion apparatus if a state in which all the adsorbed substance of the nitrogen oxide adsorbent is desorbed is detected by said adsorbed amount detecting means, thereby returning to the normal operation state, and said control is executed in each of the branch exhaust gas passages in such a manner as to prevent all the branch exhaust gas passages from simultaneously isolating the exhaust gas.

22. A method of controlling the exhaust gas purifier as claimed in claim 1, wherein a temperature detecting means and a pressure detecting means are arranged in the exhaust gas upstream side of said nitrogen oxide adsorbent, an adsorbed amount detecting means for detecting an adsorbed amount by the nitrogen oxide adsorbent is arranged in the exhaust gas downstream side of said nitrogen oxide adsorbent, an exhaust gas pressure in the exhaust gas upstream side of said nitrogen oxide adsorbent at a time of the normal operation is detected by the pressure detecting means, an adsorbed amount by said nitrogen oxide adsorbent is detected by said adsorbed amount detecting means, and the method controls such as to actuate the combustion apparatus at the same time or before of behind actuating said adsorbed substance desorbing means at any earlier time of a time when the exhaust gas pressure in the exhaust gas passage reaches a predetermined value and a time when the adsorbed amount reaches a predetermined amount.

* * * * *